(12) United States Patent  
Palaparthi et al.

(10) Patent No.: US 8,535,119 B2  
(45) Date of Patent: Sep. 17, 2013

(54) CHEMICAL MECHANICAL POLISHING PAD AND METHODS OF MAKING AND USING SAME

(75) Inventors: Ravichandra V Palaparthi, Newark, DE (US); Richard D Hreha, Beavercreek, OH (US); Benjamin John Vining, Beavercreek, OH (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 13/494,575

(22) Filed: Jun. 12, 2012

(65) Prior Publication Data

US 2012/0252324 A1    Oct. 4, 2012

Related U.S. Application Data

(62) Division of application No. 12/103,292, filed on Apr. 15, 2008, now Pat. No. 8,221,196.

(51) Int. Cl.
*B24B 7/22* (2006.01)
*B24D 11/00* (2006.01)

(52) U.S. Cl.
USPC .................. 451/41; 451/526; 51/298

(58) Field of Classification Search
USPC ............... 451/526–527, 533–534, 548, 5, 8, 451/9, 41, 59; 51/293, 297, 298
See application file for complete search history.

(56) References Cited

U.S. PATENT DOCUMENTS

| | | | |
|---|---|---|---|
| 5,032,622 A | 7/1991 | Herrington et al. | |
| 5,049,591 A | 9/1991 | Hayashi et al. | |
| 5,736,463 A * | 4/1998 | Sato | 438/692 |
| 6,090,479 A | 7/2000 | Shirato et al. | |
| 6,160,084 A | 12/2000 | Langer et al. | |
| 6,388,043 B1 | 5/2002 | Langer et al. | |
| 6,532,720 B2 | 3/2003 | Anderson | |
| 6,583,194 B2 | 6/2003 | Sendijarevic | |
| 6,592,995 B2 | 7/2003 | Topolkaraev et al. | |
| 6,720,402 B2 | 4/2004 | Langer et al. | |
| 6,783,436 B1 | 8/2004 | Muldowney | |
| 6,817,441 B2 | 11/2004 | Murakami et al. | |
| 7,081,044 B2 * | 7/2006 | Ohta et al. | 451/59 |
| 7,300,340 B1 | 11/2007 | Elmufdi et al. | |
| 7,458,885 B1 * | 12/2008 | Palaparthi | 451/527 |
| 8,038,509 B2 * | 10/2011 | Bae | 451/8 |
| 2004/0164499 A1 | 8/2004 | Murakami et al. | |
| 2004/0235392 A1 | 11/2004 | Ohta | |
| 2009/0258573 A1 | 10/2009 | Muldowney et al. | |

OTHER PUBLICATIONS

Bellin, et al., Polymeric triple-shape materials' Proc. Nat. Acad. of Sciences (2006), 103, No. 48, 18043-18047.
Lendlein et al., 'Light induced shape memory polymers', Nature 434, 879-882 (Apr. 14, 2005).
Behl and Lendlein, 'Shape-memory Polymers', Materials Today (2007) 10, No. 4, 20-28 (http://www.materialstoday.com/pdfs/april_2007/articles/MT1004_review1.pdf).
Tobushi, et. al., 'Thermomechanical properties of polyurethane shape-memory polymer foam', Journal of Intelligent Material Systems and Structures, (2001) 12, 283-287.
Lendlein and Kelch, 'Shape Memory Effect', Angew. Chem. Int. Ed (2002), 41, 2034-2057.

* cited by examiner

*Primary Examiner* — Robert Rose
(74) *Attorney, Agent, or Firm* — Thomas S. Deibert

(57) ABSTRACT

A method of making shape memory chemical mechanical polishing pads is provided, wherein the shape memory chemical mechanical polishing pads comprise a polishing layer in a densified state. Also provided is a method for using the shape memory chemical mechanical polishing pads to polish substrates.

9 Claims, 21 Drawing Sheets

CHEMICAL MECHANICAL POLISHING PAD AND METHODS OF MAKING AND USING SAME

This application is a divisional of application Ser. No. 12/103,292, filed on Apr. 15, 2008.

The present invention relates generally to the field of polishing pads for chemical mechanical polishing. In particular, the present invention is directed to a shape memory chemical mechanical polishing pad having a polishing layer in a densified state useful for chemical mechanical polishing of magnetic, optical and semiconductor substrates.

In the fabrication of integrated circuits and other electronic devices, multiple layers of conducting, semiconducting and dielectric materials are deposited onto and removed from a surface of a semiconductor wafer. Thin layers of conducting, semiconducting and dielectric materials may be deposited using a number of deposition techniques. Common deposition techniques in modern wafer processing include physical vapor deposition (PVD), also known as sputtering, chemical vapor deposition (CVD), plasma-enhanced chemical vapor deposition (PECVD) and electrochemical plating, among others. Common removal techniques include wet and dry isotropic and anisotropic etching, among others.

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful for removing undesired surface topography and surface defects, such as rough surfaces, agglomerated materials, crystal lattice damage, scratches and contaminated layers or materials.

Chemical mechanical planarization, or chemical mechanical polishing (CMP), is a common technique used to planarize or polish workpieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a polishing medium (e.g., slurry) is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

For conventional polishing pads, pad surface "conditioning" or "dressing" is critical to maintaining a consistent polishing surface for stable polishing performance. Over time the polishing surface of the polishing pad wears down, smoothing over the microtexture of the polishing surface—a phenomenon called "glazing". The origin of glazing is plastic flow of the polymeric material due to frictional heating and shear at the points of contact between the pad and the workpiece. Additionally, debris from the CMP process can clog the surface voids as well as the micro-channels through which polishing medium flows across the polishing surface. When this occurs, the polishing rate of the CMP process decreases and this can result in non-uniform polishing between wafers or within a wafer. Conditioning creates a new texture on the polishing surface useful for maintaining the desired polishing rate and uniformity in the CMP process.

Conventional polishing pad conditioning is typically achieved by abrading the polishing surface mechanically with a conditioning disk. The conditioning disk has a rough conditioning surface typically comprised of imbedded diamond points. The conditioning disk is brought into contact with the polishing surface either during intermittent breaks in the CMP process when polishing is paused ("ex situ"), or while the CMP process is underway ("in situ"). Typically the conditioning disk is rotated in a position that is fixed with respect to the axis of rotation of the polishing pad, and sweeps out an annular conditioning region as the polishing pad is rotated. The conditioning process as described cuts microscopic furrows into the pad surface, both abrading and plowing the pad material and renewing the polishing texture.

The diamonds on conventional conditioning disks become dulled with use such that the conditioning disk must be replaced after a period of time. Also, during their useful life the effectiveness of conditioning disks continually changes.

Conventional conditioning processes contribute greatly to the wear rate of CMP pads. It is common for about 95% of the wear of a pad to result from the abrasion of the diamond conditioner and only about 5% from actual contact with workpieces (e.g., semiconductor wafers).

One approach to improving CMP process efficiency is disclosed in U.S. Pat. No. 5,736,463 to Sato. Sato discloses a method for chemical mechanical polishing comprising the use of a polishing pad containing structures made of a shape memory material, wherein the structures have an upright state relative to said polishing pad before being used for polishing and a fatigue state after being used for polishing, wherein upon cessation of polishing, said structures made of a shape memory material return to said upright state.

Notwithstanding, there is a continuing need for CMP polishing pads having a polishing surface that can be renewed with a minimum of abrasive conditioning, hence extending the useful pad life.

In one aspect of the present invention, there is provided a shape memory chemical mechanical polishing pad for polishing a substrate selected from at least one of a magnetic substrate, an optical substrate and a semiconductor substrate; comprising: a polishing layer in a densified state; wherein the polishing layer comprises a shape memory matrix material transformable between an original shape and a programmed shape; wherein the polishing layer exhibits an original thickness, OT, when the shape memory matrix material is in the original shape; wherein the polishing layer exhibits a densified thickness, DT, in the densified state when the shape memory matrix material is in the programmed shape; wherein the DT is <80% of the OT; wherein the shape memory matrix material exhibits a ≧70% reduction in storage modulus as the temperature of the shape memory matrix material is raised from $(T_g-20)°$ C. to $(T_g+20)°$ C.; and, wherein the polishing layer has a polishing surface adapted for polishing the substrate.

In another aspect of the present invention, there is provided a method for producing a shape memory chemical mechanical polishing pad, comprising: providing a shape memory matrix material transformable between an original shape and a programmed shape; preparing a polishing layer in an original state exhibiting an original thickness, OT, comprising the shape memory matrix material in the original shape; subjecting the polishing layer to an external force; setting the shape memory matrix material to the programmed shape to provide the polishing layer in a densified state, wherein the polishing layer exhibits a densified thickness, DT; removing the external force; wherein the DT is <80% of the OT; wherein the shape memory matrix material exhibits a ≧70% reduction in storage modulus as the temperature of the shape memory matrix material is raised from $(T_g-20)°$ C. to $(T_g+20)°$ C.; and, wherein the polishing layer has a polishing surface adapted for polishing a substrate selected from at least one of a magnetic substrate, an optical substrate and a semiconductor substrate.

In another aspect of the present invention, there is provided a method of polishing a substrate, comprising: providing a substrate selected from at least one of a magnetic substrate, an optical substrate and a semiconductor substrate; providing a shape memory chemical mechanical polishing pad, wherein the polishing pad comprises a polishing layer in a densified state, wherein the polishing layer comprises a shape memory matrix material transformable from an original shape and a programmed shape; wherein the polishing layer in the original state exhibits an original thickness, OT, when the shape memory matrix material is in the original shape; wherein the polishing layer exhibits a densified thickness, DT, in the densified state when the shape memory matrix material is in the programmed shape; and wherein the DT is <80% of the OT; wherein the shape memory matrix material exhibits a ≧70% reduction in storage modulus as the temperature of the shape memory matrix material is raised from $(T_g-20)°$ C. to $(T_g+20)°$ C.; and, creating dynamic contact between a polishing surface of the polishing layer and the substrate to polish a surface of the substrate.

In another aspect of the present invention, there is provided a method of polishing a substrate, comprising: providing a substrate selected from at least one of a magnetic substrate, an optical substrate and a semiconductor substrate; providing a shape memory chemical mechanical polishing pad, wherein the polishing pad comprises a polishing layer in a densified state, wherein the polishing layer comprises a shape memory matrix material transformable from an original shape and a programmed shape; wherein the polishing layer in the original state exhibits an original thickness, OT, when the shape memory matrix material is in the original shape; wherein the polishing layer exhibits a densified thickness, DT, in the densified state when the shape memory matrix material is in the programmed shape; and wherein the DT is <80% of the OT; wherein the shape memory matrix material exhibits a ≧70% reduction in storage modulus as the temperature of the shape memory matrix material is raised from $(T_g-20)°$ C. to $(T_g+20)°$ C.; creating dynamic contact between a polishing surface of the polishing layer and the substrate to polish a surface of the substrate and conditioning the polishing surface of the polishing layer by exposing at least a portion of the polishing layer proximate the polishing surface to an activating stimulus, wherein the portion of the polishing layer proximate the polishing surface exposed to the activating stimulus transitions from the densified state to a recovered state.

DETAILED DESCRIPTION

Figure 1:
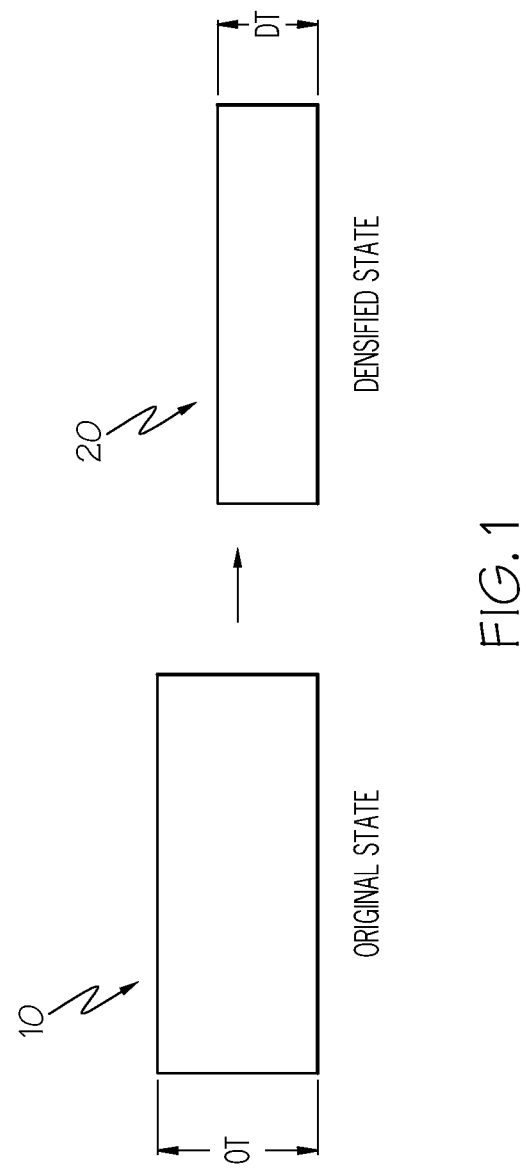
FIG. 1 is a comparative depiction of an elevation view of polishing layer of the present invention in an original state and a densified state.

The term "fibrillar morphology" as used herein and in the appended claims refers to a morphology of a phase in which the phase domains have a three dimensional shape with one dimension much larger than the other two dimensions.

The term "polishing medium" as used herein and in the appended claims encompasses particle-containing polishing solutions and non-particle-containing solutions, such as abrasive-free and reactive-liquid polishing solutions.

The term "substantial relaxation" as used herein and in the appended claims means a sufficient relaxation in the shape memory matrix material in the polishing layer to cause a ≧2% increase in the polishing layer's average thickness measured using a granite base comparator (e.g., a Chicago Dial Indicator Cat #6066-10).

The term "substantially circular cross section" as used herein and in the appended claims in reference to the polishing surface means that the radius, r, of the cross section from the central axis to the outer periphery of the polishing surface varies by ≦20% for the cross section. (See FIG. 4).

The glass transition temperature ("Tg") as used herein and in the appended claims is measured by the dynamical mechanical analysis (DMA) taking the inflection point in the storage modulus versus temperature curve as the $T_g$ value.

The term "original state" as used herein and in the appended claims in reference to a polishing layer of a shape memory chemical mechanical polishing pad of the present invention means the as made state before subjecting it to an external force to "lock-in" a reversible shape deformation to set the polishing layer in a densified state.

The term "microtexture" used herein and in the appended claims in reference to the polishing surface refers to the intrinsic microscopic bulk texture of the polishing surface after manufacture. Some of the factors which influence the static morphology or microscopic bulk texture of the polishing surface are the nature and texture including waves, holes, creases, ridges, slits, depressions, protrusions and gaps, and the size, shape and distribution, frequency or spacing of individual features or artifacts. The microtexture is typically largely random and is the result of factors intrinsic to the manufacturing process of the polishing layer.

The term "macrotexture" as used herein and in the appended claims in reference to the polishing surface refers to larger size textured artifacts that may be imposed by embossing, skiving, perforating and/or machining of the polishing surface.

The term "circumference fraction grooved" or "CF" as used herein and in the appended claims is defined by the following formula:

$$CF = \left\{ \frac{\text{(Portion of circumference at a given radius,}}{\text{(Full circumference at the given radius, } R)} \right\}$$

Note that if CF is constant as a function of radius for the polishing surface of a given shape memory chemical mechanical polishing pad, then the fractional portion of the polishing surface that is grooved (or ungrooved) at a given radius will also be constant as a function of radius.

The term "shape memory matrix material" as used herein and in the appended claims refers to materials that have the ability to exhibit a shape memory effect. That is, any materials or combination of materials that exhibit the following properties: (1) are capable of being deformed in at least one spatial dimension when exposed to an external force, (2) are capable of locking-in and maintaining a degree of the deformation in at least one spatial dimension after removal of the external force, and (3) are capable of exhibiting a recovery in at least one spatial dimension when subjected to an activating stimulus. Shape memory matrix materials are a class of smart materials that are designed and manufactured to react in a predetermined way according to changes in their environment. Shape memory matrix materials can be deformed from an original shape and fixed into a temporary (programmed) shape and upon exposure to an activating stimulus react to recover to a recovered shape that approximates the original shape.

The shape memory effect involves the programming of a "programmed shape" in a shape memory matrix material and subsequently causing the shape memory matrix material to recover to a "recovered shape" (which approximates the original shape) upon exposure of the shape memory matrix material to an activating stimulus. A shape memory matrix material is processed into the original shape by conventional methods. Subsequently it is deformed by exposure to an external force and a desired programmed shape is fixed. This later process is referred to herein as programming.

The "storage modulus" for a shape memory matrix material of the present invention is a measure of the stored elastic energy in the shape memory matrix material. The storage modulus represents a ratio of the stress in phase (with the strain) to the applied strain and is measured using a TA Q800 Dynamic Mechanical Analyzer using a single-cantilever clamp setup and a "multi-frequency-strain" testing mode of the instrument.

In some embodiments of the present invention, the shape memory chemical mechanical polishing pad for polishing a substrate selected from at least one of a magnetic substrate, an optical substrate and a semiconductor substrate; comprising: a polishing layer in a densified state; wherein the polishing layer comprises a shape memory matrix material transformable between an original shape and a programmed shape; wherein the polishing layer exhibits an original thickness, OT, when the shape memory matrix material is in the original shape; wherein the polishing layer exhibits a densified thickness, DT, in the densified state when the shape memory matrix material is in the programmed shape; wherein the DT is <80% of the OT; wherein the shape memory matrix material exhibits a ≧70% reduction in storage modulus as the temperature of the shape memory matrix material is raised from $(T_g-20)°$ C. to $(T_g+20)°$ C.; and, wherein the polishing layer has a polishing surface adapted for polishing the substrate. In some aspects of these embodiments, the shape memory matrix material exhibits a ≧75% reduction; ≧80% reduction; ≧85% reduction; or ≧90% reduction in storage modulus as the temperature of the shape memory matrix material is raised from $(T_g-20)°$ C. to $(T_g+20)°$ C.; $(T_g-10)°$ C. to $(T_g+10)°$ C.; or $(T_g-5)°$ C. to $(T_g+5)°$ C. In some aspects of these embodiments, the reduction in storage modulus has a magnitude of ≧800 MPa; ≧900 MPa; ≧1,000 MPa; ≧800 MPa and ≦10,000 MPa; ≧800 MPa and ≦5,000 MPa; or ≧800 MPa and ≦2,500 MPa. In some aspects of these embodiments, the shape memory matrix material exhibits a ≧90% reduction in storage modulus as the temperature of the shape memory matrix material is raised from $(T_g-10)°$ C. to $(T_g+10)°$ C., wherein the reduction in storage modulus has a magnitude of ≧800 MPa.

In some embodiments of the present invention, the shape memory matrix material is selected to exhibit a transition in storage modulus over a temperature range. Generally speaking, the higher the magnitude of the transition in storage modulus and the narrower the temperature range over which the transition occurs, the better the shape memory effect for the shape memory matrix material.

In some embodiments of the present invention, the shape memory matrix material comprises at least one polymer. In some aspects of these embodiments, the shape memory matrix material comprises at least one polymer selected from segmented block copolymers comprising at least one hard segment and at least one soft segment. In some aspects of these embodiments, the shape memory matrix material comprises at least one polymer selected from polyester based thermoplastic polyurethanes; polyether based polyurethanes; polyethylene oxide; poly(ether ester) block copolymers; polyamides; poly(amide esters); poly(ether amide) copolymers; polyvinyl alcohol; polyvinyl pyrrolidone; polyvinyl pyridine; polyacrylic acid; polymethacrylic acid; polyaspartic acid; maleic anhydride methylvinyl ether copolymers; polyvinyl methyl ether copolymers of polyacrylic acid and polyacrylic esters; styrenic polymers; epoxide based polymers; polycyanurates; and combinations thereof (e.g., copolymers and blends). In some aspects of these embodiments, the shape memory matrix material comprises a segmented block copolymer comprising at least one hard segment and at least one soft segment, where either the soft segment, the hard segment, or both contain functional groups or receptor sites that are "stimuli responsive", i.e. that enable a desired amount of shape recovery when exposed to an activating stimulus.

In some embodiments of the present invention, the shape memory matrix material comprises a segmented block copolymer. In some aspects of these embodiments, the segmented block copolymer is selected from polyurethane elastomers, polyether elastomers, poly(ether amide) elastomers, polyether polyester elastomers, polyamide-based elastomers, thermoplastic polyurethanes, poly(ether-amide) block copolymers, thermoplastic rubbers (e.g., uncrosslinked polyolefins), styrene-butadiene copolymers, silicon rubbers, synthetic rubbers (e.g., nitrile rubber and butyl rubber), ethylene-vinyl acetate copolymers, styrene-isoprene copolymers, styrene-ethylene-butylene copolymers and combinations thereof. In some aspects of these embodiments, the shape memory matrix material further comprises a non-elastomeric polymer. In some aspects of these embodiments, the non-elastomeric polymer is selected from polyethylene oxide, copolymers of polylactic acid and combinations thereof.

In some embodiments of the present invention, the shape memory matrix material comprises a polyurethane. In some aspects of these embodiments, the polyurethane is selected from polyester-based aromatic polyurethanes; polyester-based aliphatic polyurethanes; polyether-based aliphatic and aromatic polyurethanes; and combinations thereof.

In some embodiments of the present invention, the shape memory matrix material comprises a reaction product of a mixture comprising a polyether-based, toluene diisocyanate terminated liquid urethane prepolymer; and a 4,4'-methylene-bis(2-chloroaniline).

In some embodiments of the present invention, the shape memory matrix material comprises a reaction product of a mixture comprising glycerol propoxylate; polycarbodiimide-modified diphenylmethane diisocyanate; and at least one of polytetrahydrofuran and polycaprolactone. In some aspects of these embodiments, the shape memory matrix material comprises a reaction product of a mixture comprising glycerol propoxylate; polycarbodiimide-modified diphenylmethane diisocyanate; and polytetrahydrofuran. In some aspects of these embodiments, the shape memory matrix material comprises a reaction product of a mixture comprising glycerol propoxylate; polycarbodiimide-modified diphenylmethane diisocyanate; and polycaprolactone.

In some embodiments of the present invention, the shape memory matrix material is selected to exhibit a $T_g$ of $\geq 45°$ C. and $\leq 80°$ C. In some aspects of these embodiments, the shape memory matrix material is selected to exhibit a $T_g$ of $\geq 45°$ C. and $\leq 75°$ C.; $\geq 50°$ C. and $\leq 75°$ C.; $\geq 55°$ C. and $\leq 75°$ C.; $\geq 55°$ C. and $\leq 70°$ C.; or $\geq 55°$ C. and $\leq 65°$ C.

In some embodiments of the present invention, the polishing layer further comprises a plurality of microelements. In some aspects of these embodiments, the plurality of microelements is uniformly dispersed within the polishing layer. In some aspects of these embodiments, the plurality of microelements are selected from entrapped gas bubbles, hollow core polymeric materials, liquid filled hollow core polymeric materials, water soluble materials and an insoluble phase material (e.g., mineral oil). In some aspects of these embodiments, the plurality of microelements comprises hollow core polymeric materials uniformly distributed throughout the polishing layer.

In some embodiments of the present invention, the polishing layer further comprises a plurality of microelements, wherein the plurality of microelements comprise gas filled hollow core polymer particles. In some aspects of these embodiments, at least a portion of the hollow core polymer particles are generally flexible.

In some embodiments of the present invention, the polishing layer further comprises a plurality of microelements, wherein the plurality of microelements comprises fluid filled hollow core polymer particles. In some aspects of these embodiments, the microelements are filled with a polishing fluid that is dispensed when the microelements are ruptured by abrasion when the polishing pad is used during a polishing operation.

In some embodiments of the present invention, the polishing layer further comprises a plurality of microelements, wherein the plurality of microelements comprise water soluble materials that are dissolved by water present during a polishing operation. In some aspects of these embodiments, the plurality of microelements are selected from water soluble inorganic salts, water soluble sugars and water soluble particles. In some aspects of these embodiments, the plurality of microelements are selected from polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes, cyclodextrin and combinations thereof. In some aspects of these embodiments, the plurality of microelement has a weight average particle size of 10 to 100 µm. In some aspects of these embodiments, the plurality of microelements have a weight average particle size of 15 to 90 µm. In some aspects of these embodiments, the plurality of microelements have a weight average particle size of 15 to 50 µm. In some aspects of these embodiments, the plurality of microelements can be chemically modified to change the solubility, swelling and other properties thereof by, for example, branching, blocking, and crosslinking In some aspects of these embodiments, the plurality of microelements comprises a hollow core copolymer of polyacrylonitrile and polyvinylidene chloride (e.g., Expancel™ from Akzo Nobel of Sundsvall, Sweden). In some aspects of these embodiments, the plurality of microelements comprises a cyclodextrine.

In some embodiments of the present invention, the polishing layer comprises a shape memory matrix material that forms a lattice structure. In some aspects of these embodiments, the polishing layer comprises $\leq 70$ vol % shape memory matrix material when the polishing layer is in the original state. In some aspects of these embodiments, the polishing layer comprises at least two repeating layers of lattice structure.

In some embodiments of present invention, the shape memory matrix material in the polishing layer forms a reticulated network. In some aspects of these embodiments, the reticulated network exhibits a gyroid morphology. In some aspects of these embodiments, the reticulated network exhibits a fibrillar morphology. In some aspects of these embodiments, the reticulated network comprises an interconnected network of structural members. In some aspects of these embodiments, the interconnected network of structural members comprehends open interconnected networks in which individual elements are positioned at all angles from fully horizontal to fully vertical. In some aspects of these embodiments, the interconnected network comprises entirely random arrays of interconnected slender elements in which there is no clearly repeating size or shape to the void spaces formed thereby. In some aspects of these embodiments, the polishing layer comprises a shape memory matrix material formed into entirely random arrays of interconnected slender elements in which there is no clearly repeating size or shape to the void spaces, or where many elements are highly curved, branched, or entangled. In some aspects of these embodiments, the interconnected network may resemble bridge trusses, stick models of macromolecules, and interconnected human nerve cells.

In some embodiments of the present invention, the polishing layer has a combined porosity and/or microelement concentration of 0.2 to 80 vol % when the polishing layer is in the original state. In some aspects of these embodiments, the polishing layer has a combined porosity and/or microelement concentration of 0.3 to 80 vol % when the polishing layer is in the original state. In some aspects of these embodiments, the polishing layer has a combined porosity and/or microelement concentration of 0.55 to 70 vol % when the polishing layer is in the original state. In some aspects of these embodiments, the polishing layer has a combined porosity and/or microelement concentration of 0.6 to 60 vol % when the polishing layer is in the original state.

In some embodiments of the present invention the shape memory chemical mechanical polishing pad for polishing a substrate selected from at least one of a magnetic substrate, an optical substrate and a semiconductor substrate; comprises: a polishing layer in a densified state; wherein the polishing layer comprises a shape memory matrix material transformable between an original shape (i.e., an as made shape) and a programmed shape; wherein the polishing layer exhibits an original thickness, OT, when the shape memory matrix material is in the original shape; wherein the polishing layer exhibits a densified thickness, DT, in the densified state when the shape memory matrix material is in the programmed shape; wherein the DT is $\leq 80\%$ of the OT; and, wherein the polishing layer has a polishing surface adapted for polishing the substrate. In some aspects of these embodiments, the densified thickness, DT, is $\leq 70\%$ of the original thickness, OT. In some aspects of these embodiments, the densified thickness, DT, is between 70 and 40% of the original thickness, OT. In some aspects of these embodiments, the substrate is a semiconductor substrate. In some aspects of these embodiments, the substrate is a semiconductor wafer.

In some embodiments of the present invention, the polishing layer has a densified thickness of 20 to 150 mils. In some aspects of these embodiments, the polishing layer has a densified thickness of 30 to 125 mils. In some aspects of these embodiments, the polishing layer has a densified thickness of 40 to 120 mils.

In some embodiments of the present invention, the shape memory chemical mechanical polishing pad is adapted to be interfaced with a platen of a polishing machine. In some aspects of these embodiments, the shape memory chemical mechanical polishing pad is adapted to be affixed to the platen. In some aspects of these embodiments, the shape memory chemical mechanical polishing pad is adapted to be affixed to the platen using at least one of a pressure sensitive adhesive and vacuum.

In some embodiments of the present invention, the shape memory chemical mechanical polishing pad has a central axis and is adapted for rotation about the central axis. (See FIG. 4). In some aspects of these embodiments, the polishing layer 210 of the shape memory chemical mechanical polishing pad is in a plane substantially perpendicular to the central axis 212. In some aspects of these embodiments, the polishing layer 210 is adapted for rotation in a plane that is at an angle, $\gamma$, of 80 to 100° to the central axis 212. In some aspects of these embodiments, the polishing layer 210 is adapted for rotation in a plane that is at an angle, $\gamma$, of 85 to 95° to the central axis 212. In some aspects of these embodiments, the polishing layer 210 is adapted for rotation in a plane that is at an angle, $\gamma$, of 89 to 91° to the central axis 212. In some aspects of these embodiments, the polishing layer 210 has a polishing surface 214 that has a substantially circular cross section perpendicular to the central axis 212. In some aspects of these embodiments, the radius, r, of the cross section of the polishing surface 214 perpendicular to the central axis 212 varies by $\leq 20\%$ for the cross section. In some aspects of these embodiments, the radius, r, of the cross section of the polishing surface 214 perpendicular to the central axis 212 varies by $\leq 10\%$ for the cross section.

In some embodiments of the present invention, the shape memory chemical mechanical polishing pad comprises a polishing layer interfaced with a base layer. In some aspects of these embodiments, the polishing layer is attached to the base layer using an adhesive. In some aspects of these embodiments, the adhesive is selected from pressure sensitive adhesives, hot melt adhesives, contact adhesives and combinations thereof. In some aspects of these embodiments, the adhesive is a hot melt adhesive. In some aspects of these embodiments, the adhesive is a contact adhesive. In some aspects of these embodiments, the adhesive is a pressure sensitive adhesive.

In some embodiments of the present invention, the shape memory chemical mechanical polishing pad comprises a polishing layer, a base layer and at least one additional layer interposed between the base layer and the polishing layer.

In some embodiments of the present invention, the shape memory chemical mechanical polishing pad has a polishing surface exhibiting at least one of macrotexture and microtexture to facilitate polishing the substrate.

In some embodiments of the present invention, the shape memory chemical mechanical polishing pad has a polishing surface exhibiting macrotexture. In some aspects of these embodiments, the macrotexture is designed to alleviate at least one of hydroplaning; to influence polishing medium flow; to modify the stiffness of the polishing layer; to reduce edge effects; and, to facilitate the transfer of polishing debris away from the area between the polishing surface and the substrate.

In some embodiments of the present invention, the shape memory chemical mechanical polishing pad has a polishing surface exhibiting macrotexture selected from at least one of perforations and grooves. In some aspects of these embodiments, the perforations can extend from the polishing surface part way or all of the way through the actual thickness of the polishing layer. In some aspects of these embodiments, the grooves are arranged on the polishing surface such that upon rotation of the pad during polishing, at least one groove sweeps over the substrate. In some aspects of these embodiments, the grooves are selected from curved grooves, linear grooves and combinations thereof.

In some embodiments of the present invention, the polishing layer has a macrotexture comprising a groove pattern. In some aspects of these embodiments, the groove pattern comprises at least one groove. In some aspects of these embodiments, the groove pattern comprises a plurality of grooves. In some aspects of these embodiments, the at least one groove is selected from curved grooves, straight grooves and combinations thereof. In some aspects of these embodiments, the groove pattern is selected from a groove design including, for example, concentric grooves (which may be circular or spiral), curved grooves, cross-hatch grooves (e.g., arranged as an X-Y grid across the pad surface), other regular designs (e.g., hexagons, triangles), tire-tread type patterns, irregular designs (e.g., fractal patterns), and combinations thereof. In some aspects of these embodiments, the groove pattern is selected from random, concentric, spiral, cross-hatched, X-Y grid, hexagonal, triangular, fractal and combinations thereof. In some aspects of these embodiments, the groove profile is selected from rectangular with straight side-walls or the groove cross-section may be "V"-shaped, "U"-shaped, triangular, saw-tooth, and combinations thereof. In some aspects of these embodiments, the groove pattern is a groove design that changes across the polishing surface. In some aspects of these embodiments, the groove design is engineered for a specific application. In some aspects of these embodiments, the groove dimensions in a specific design may be varied across the pad surface to produce regions of different groove densities.

In some embodiments of the present invention, the shape memory chemical mechanical polishing pad has a macrotexture comprising a groove pattern that comprises at least one groove, wherein CF remains within 25%, preferably within 10%, more preferably within 5% of its average value as a function of a polishing pad radius, R, in an area extending from an outer radius, $R_O$, of a polishing surface a majority distance to an origin, O, at a center of the polishing surface. In some aspects of these embodiments, CF remains within 25%, preferably within 10%, more preferably within 5% of its average value as a function of a polishing pad radius, R, in an area extending from a base radius, $R_B$, to an outer radius, $R_O$. (See, e.g., FIG. 10).

In some embodiments of the present invention, the shape memory chemical mechanical polishing pad has a macrotexture comprising at least one groove. In some aspects of these embodiments, the at least one groove has a depth of $\geq 20$ mils. In some aspects of these embodiments, the at least one groove has a depth of 20 to 100 mils. In some aspects of these embodiments, the at least one groove has a depth of 20 to 60 mils. In some aspects of these embodiments, the at least one groove has a depth of 20 to 50 mils.

In some embodiments of the present invention, the shape memory chemical mechanical polishing pad has a macrotexture comprising a groove pattern that comprises at least two grooves having a depth of $\geq 15$ mils; a width of $\geq 10$ mils and a pitch of $\geq 50$ mils. In some aspects of these embodiments, the groove pattern comprises at least two grooves having a depth of $\geq 20$ mils; a width of $\geq 15$ mils and a pitch of $\geq 70$ mils. In some aspects of these embodiments, the groove pattern comprises at least two grooves having a depth of $\geq 20$ mils; a width of $\geq 15$ mils and a pitch of $\geq 90$ mils.

In some embodiments of the present invention, the shape memory chemical mechanical polishing pad has a polishing surface that exhibits microtexture.

In some embodiments of the present invention, the method for producing a shape memory chemical mechanical polishing pad, comprises: providing a shape memory matrix material transformable between an original shape and a programmed shape; preparing a polishing layer in an original state exhibiting an original thickness, OT, comprising the shape memory matrix material in the original shape; subjecting the polishing layer to an external force; setting the shape memory matrix material to the programmed shape to provide the polishing layer in a densified state, wherein the polishing layer exhibits a densified thickness, DT; removing the external force; wherein the DT is $\leq 80\%$ of the OT; wherein the shape memory matrix material exhibits a $\geq 70\%$ reduction in storage modulus as the temperature of the shape memory matrix material is raised from $T_g-20°$ C. to $T_g+20°$ C.; and, wherein the polishing layer has a polishing surface adapted for polishing a substrate selected from at least one of a magnetic substrate, an optical substrate and a semiconductor substrate. In some aspects of these embodiments, the densified thickness, DT, is $\leq 70\%$ of the original thickness, OT. In some aspects of these embodiments, the densified thickness, DT, is between 70 and 40% of the original thickness, OT. In some aspects of these embodiments, the shape memory matrix material exhibits a $\geq 75\%$ reduction; $\geq 80\%$ reduction; $\geq 85\%$ reduction; or $\geq 90\%$ reduction in storage modulus as the temperature of the shape memory matrix material is raised from $(T_g-20)°$ C. to $(T_g+20)°$ C.; $(T_g-10)°$ C. to $(T_g+10)°$ C.; or $(T_g-5)°$ C. to $(T_g+5)°$ C. In some aspects of these embodiments, the reduction in storage modulus has a magnitude of $\geq 800$ MPa; $\geq 900$ MPa; $\geq 1,000$ MPa; $\geq 800$ MPa and $\leq 10,000$ MPa; $\geq 800$ MPa and $\leq 5,000$ MPa; or $\geq 800$ MPa and $\leq 2,500$ MPa. In some aspects of these embodiments, the shape memory matrix material exhibits a $\geq 90\%$ reduction in storage modulus as the temperature of the shape memory matrix material is raised from $(T_g-10)°$ C. to $(T_g+10)°$ C., wherein the reduction in storage modulus has a magnitude of $\geq 800$ MPa. In some aspects of these embodiments, the substrate is a semiconductor substrate. In some aspects of these embodiments, the substrate is a semiconductor wafer.

In some embodiments of the present invention, the method for producing a shape memory chemical mechanical polishing pad further comprises interfacing the polishing layer to a base layer. In some aspects of these embodiments, the polishing layer is interfaced with the base layer using an adhesive. In some aspects of these embodiments, the adhesive is selected from pressure sensitive adhesives, contact adhesives, hot melt adhesives and combinations thereof.

In some embodiments of the present invention, the method for producing a shape memory chemical mechanical polishing pad comprises: providing a shape memory matrix material transformable between an original shape and a programmed shape; preparing a polishing layer in an original state exhibiting an original thickness, OT, comprising the shape memory matrix material in the original shape; heating the polishing layer to a temperature $\geq (T_g+10)°$ C.; subjecting the polishing layer to an external force, wherein the external force is an axial force that axially compresses the polishing layer; setting the shape memory matrix material to the programmed shape to provide the polishing layer in a densified state, wherein the polishing layer exhibits a densified thickness, DT; cooling the polishing layer to a temperature $<(T_g-10)°$ C. while maintaining the axial force to set the polishing layer in the densified state; and, removing the external force; wherein $T_g$ is the glass transition temperature for the shape memory matrix material; wherein the DT is $\leq 80\%$ of the OT; and, wherein the polishing layer has a polishing surface adapted for polishing a substrate selected from at least one of a magnetic substrate, an optical substrate and a semiconductor substrate. In some aspects of these embodiments, the polishing layer is heated to a temperature $\geq (T_g+10)°$ C., but below the decomposition temperature for the shape memory matrix material. In some aspects of these embodiments, the substrate is a semiconductor substrate. In some aspects of these embodiments, the substrate is a semiconductor wafer. In some aspects of these embodiments, the method further comprises interfacing the polishing layer with a base layer. In some aspects of these embodiments, the polishing layer is heated and compressed in the thickness direction to facilitate programming of the shape memory matrix material and to transition the polishing layer from the original state to the densified state.

In some embodiments of the present invention, the method for producing a shape memory chemical mechanical polishing pad further comprises: incorporating macrotexture into the polishing layer. In some aspects of these embodiments, the macrotexture comprises at least one groove. In some aspects of these embodiments, the macrotexture comprises a multiplicity of perforations. In some aspects of these embodiments, the macrotexture comprises a combination of at least one groove and a multiplicity of perforations. In some aspects of these embodiments, the macrotexture is incorporated into the polishing layer when the polishing layer is in the densified state. In some aspects of these embodiments, the macrotexture is incorporated into the polishing layer when the polishing layer is in the original state. In some aspects of these embodiments, the macrotexture is incorporated into the polishing layer when the polishing layer is in the original state and some of the macrotexture is incorporated into the polishing layer when the polishing layer is in the densified state.

In some embodiments of the present invention, macrotexture is incorporated into the polishing layer when the polishing layer is in the densified state. In some aspects of these embodiments, the macrotexture is incorporated in the polishing layer using a cutting bit. In some aspects of these embodiments, it may be desirable to cool the cutting bit or the polishing layer or both to minimize the amount of shape memory matrix material that transitions from a programmed shape to a recovered shape on account of the macrotexture incorporation process. In some aspects of these embodiments, the process of incorporating the macrotexture into the polishing layer comprises cooling the cutting bit, cooling a region of the polishing layer in proximity with the cutting bit or a combination thereof. In some aspects of these embodiments, the cooling can be achieved through various techniques, for example, blowing compressed air over the cutting bit to facilitate convection, blowing chilled air over the cutting bit, spraying the cutting bit with water or blowing cooled gases on the cutting bit. In some aspects of these embodiments, the cooling is achieved by blowing cooled, liquefied or cryogenic gas (e.g., argon, carbon dioxide, nitrogen) directly onto the cutting bit, a region of the polishing pad in proximity to the cutting bit, or a combination thereof. In some aspects of these embodiments, the cooled, liquefied or cryogenic gas is sprayed through a specialized nozzle or nozzles, wherein the gas rapidly expands, cools, and forms solid crystals or liquid to facilitate heat transfer. In some aspects of these embodiments, the use of such cooling techniques involve the creation of a flow of material (e.g., gas, liquid or crystals) and directing the flow to encounter the cutting bit, the region of the polishing layer in proximity with the cutting bit, or both. In some aspects of these embodiments, the flow of material directed at the polishing pad in the region in proximity with the cutting bit has the additional effect of aiding in the removal of chips formed in the macrotexture incorporation process. Removing these chips may be beneficial in that it reduces the potential for the chips reattaching to the polishing layer, for example, by melting, fusing or welding. To the extent that removing chips during the macrotexture incorporation process reduces the number of chips that reattach to the polishing layer, defects in subsequent polishing operations using the polishing layer may be avoided. In some aspects of these embodiments, the entire polishing layer is cryogenically cooled. In some aspects of these embodiments, the entire polishing layer and the machining fixture used to power the cutting bit is cryogenically cooled.

In some embodiments of the present invention, the external force applied to the polishing layer to set the shape memory matrix material in the programmed shape is a nominal axial force that imposes a nominal pressure on the polishing layer of $\geq 150$ psi. In some aspects of these embodiments, the nominal pressure imposed on the polishing layer is $\geq 300$ psi. In some aspects of these embodiments, the nominal pressure imposed on the polishing layer is 150 to 10,000 psi. In some aspects of these embodiments, the nominal pressure imposed on the polishing layer is 300 to 5,000 psi. In some aspects of these embodiments, the nominal pressure imposed on the polishing layer is 300 to 2,500 psi.

In some embodiments of the present invention, the method for producing a shape memory chemical mechanical polishing pad, comprises: providing a shape memory matrix material transformable between an original shape and a programmed shape; providing a plurality of microelements; dispersing the plurality of microelements in the shape memory matrix material; preparing a polishing layer in an original state exhibiting an original thickness, OT, comprising the shape memory matrix material in the original shape; heating the polishing layer to a temperature above the glass transition temperature, $T_g$, for the shape memory matrix material; applying an axial force to axially compress the polishing layer to a densified thickness, DT, while maintaining the temperature of the polishing layer above the $T_g$ of the shape memory matrix material; setting the shape memory matrix material in the programmed shape by cooling the polishing layer to a temperature below the $T_g$ of the shape memory matrix material, while maintaining the axial force; and, removing the axial force; wherein the DT is $\leq 80\%$ of the OT; wherein the shape memory matrix material exhibits a $\geq 70\%$ reduction in storage modulus as the temperature of the shape memory matrix material is raised from $(T_g-20)°$ C. to $(T_g+20)°$ C.; and, wherein the polishing layer has a polishing surface adapted for polishing a substrate, wherein the substrate is selected from at least one of a magnetic substrate, an optical substrate and a semiconductor substrate. In some aspects of these embodiments, the shape memory matrix material exhibits a $\geq 75\%$ reduction; $\geq 80\%$ reduction; $\geq 85\%$ reduction; or $\geq 90\%$ reduction in storage modulus as the temperature of the shape memory matrix material is raised from $(T_g-20)°$ C. to $(T_g+20)°$ C.; $(T_g-10)°$ C. to $(T_g+10)°$ C.; or $(T_g-5)°$ C. to $(T_g+5)°$ C. In some aspects of these embodiments, the reduction in storage modulus has a magnitude of $\geq 800$ MPa; $\geq 900$ MPa; $\geq 1,000$ MPa; $\geq 800$ MPa and $\leq 10,000$ MPa; $\geq 800$ MPa and $\leq 5,000$ MPa; or $\geq 800$ MPa and $\leq 2,500$ MPa. In some aspects of these embodiments, the shape memory matrix material exhibits a $\geq 90\%$ reduction in storage modulus as the temperature of the shape memory matrix material is raised from $(T_g-10)°$ C. to $(T_g+10)°$ C., wherein the reduction in storage modulus has a magnitude of $\geq 800$ MPa. In some aspects of these embodiments, the method further comprises interfacing the polishing layer with a platen of a polishing machine. In some aspects of these embodiments, the method further comprises interfacing the polishing layer with a platen using at least one of a pressure sensitive adhesive and vacuum. In some aspects of these embodiments, the method further comprises interfacing the polishing layer with a base layer. In some aspects of these embodiments, the method further comprises attaching the polishing layer to a base layer using an adhesive and interfacing the base layer with the platen of a polishing machine using a pressure sensitive adhesive and/or vacuum. In some aspects of these embodiments, the densified thickness, DT, is ≦70% of the original thickness, OT. In some aspects of these embodiments, the densified thickness, DT, is 70 to 40% of the original thickness. In some aspects of these embodiments, the substrate is a semiconductor substrate. In some aspects of these embodiments, the substrate is a semiconductor wafer.

In some embodiments of the present invention, the polishing layer is prepared comprising the shape memory matrix material in the original shape by any known means to provide the polishing layer in the original state exhibiting an original thickness, OT. In some aspects of these embodiments, the polishing layer is made by a process selected from casting, injection molding (including reaction injection molding), extruding, web-coating, photopolymerizing, sintering, printing (including inkjet printing and screen printing), spin-coating, weaving, skiving and combinations thereof. In some aspects of these embodiments, the polishing layer is prepared by a combination of casting and skiving.

In some embodiments of the present invention, the polishing layer is converted from the original state having an original thickness, OT, to a densified state having an densified thickness, DT, by applying a force to compress the polishing layer at a temperature around or above the glass transition temperature, $T_g$, for the shape memory matrix material; cooling the polishing layer to a temperature below the $T_g$ to lock in the densified thickness, DT; and removing the force applied to compress the polishing layer.

When the shape memory matrix material in the polishing layer in a programmed shape is subjected to an activating stimulus it reacts by transitioning into a recovered shape. In some embodiments of the present invention, the shape memory chemical mechanical polishing pads are periodically conditioned during use when polishing a substrate to renew the polishing surface. In some aspects of these embodiments, the conditioning process comprises the application of an activating stimulus to at least a portion of the polishing layer. In some aspects of these embodiments, the activating stimulus is selected from exposure to heat, light, an electric field, a magnetic field, ultrasound, water and combinations thereof. Upon exposure to the activating stimulus, the portion of the polishing layer activated increases in thickness to a recovered thickness, RT. Ideally, the total recovered thickness, TRT of the polishing layer upon exposure of the entire densified thickness to the activating stimulus (hereinafter the "maximum total recovered thickness, MTRT") would approximate the original thickness of the polishing layer. In practice, however, it is not critical that the maximum total recovered thickness equal the original thickness. In some aspects of these embodiments, the maximum total recovered thickness, MTRT, is ≧80% of the original thickness, OT. In some aspects of these embodiments, the maximum total recovered thickness, MTRT, is ≧85% of the original thickness, OT. In some aspects of these embodiments, the maximum total recovered thickness, MTRT, is ≧90% of the original thickness, OT.

In some embodiments of the present invention, the polishing layer of a shape memory chemical mechanical polishing pad is periodically conditioned during use by heating at least a portion of the polishing layer proximate the polishing surface to a temperature at or above the glass transition temperature, $T_g$, of the shape memory matrix material. As a result of this heating, some of the shape memory matrix material in the polishing layer proximate to the polishing surface transitions to a recovered shape modifying and reconditioning the polishing surface. In some aspects of these embodiments, the polishing surface is also subjected to conventional conditioning processes. Notwithstanding, the response by the at least a portion of the shape memory matrix material of the polishing layer proximate to the polishing surface to transition to a recovered shape allows polishing of several substrates with similar polishing characteristics and reduces the need to periodically dress or condition the pad using conventional conditioning processes. This reduction in conventional conditioning helps to extend the useful life of the shape memory chemical mechanical polishing pads and lowers their cost of use.

In some embodiments of the present invention, perforations through the pad, the introduction of conductive-lined grooves or the incorporation of a conductor, such as conductive fibers, conductive network, metal grid or metal wire, can transform the shape memory chemical mechanical polishing pads into eCMP ("electrochemical mechanical planarization") polishing pads.

In some embodiments of the present invention, the transition temperature for the shape memory matrix material is selected such that standard polishing conditions do not result in a substantial relaxation of the polishing layer from its densified state.

In some embodiments of the present invention, the transition temperature for the shape memory matrix material is selected to facilitate transition from a programmed shape to a recovered shape of a portion of the shape memory matrix material in the polishing layer proximate the polishing surface induced by the conditions present during the polishing process. In some aspects of these embodiments, the transition is induced by heating the slurry. In some aspects of these embodiments, the transition is induced by heat generated at the polishing surface from the rigors of the polishing process.

In some embodiments of the present invention, the method of polishing a substrate, comprises: providing a substrate selected from at least one of a magnetic substrate, an optical substrate and a semiconductor substrate; providing a shape memory chemical mechanical polishing pad, wherein the polishing pad comprises a polishing layer in a densified state, wherein the polishing layer comprises a shape memory matrix material transformable from an original shape and a programmed shape; wherein the polishing layer in the original state exhibits an original thickness, OT, when the shape memory matrix material is in the original shape; wherein the polishing layer exhibits a densified thickness, DT, in the densified state when the shape memory matrix material is in the programmed shape; and wherein the DT is ≦80% of the OT; wherein the shape memory matrix material exhibits a ≧70% reduction in storage modulus as the temperature of the shape memory matrix material is raised from $(T_g-20)°$ C. to $(T_g+20)°$ C.; and, creating dynamic contact between a polishing surface of the polishing layer and the substrate to polish a surface of the substrate. In some aspects of these embodiments, the method further comprises renewing the polishing surface in situ or ex situ by exposing at least a portion of the polishing layer proximate the polishing surface to an activating stimulus, wherein the activating stimulus causes a portion of the polishing layer proximate the polishing surface to transition to a recovered state. In some aspects of these embodiments, the densified thickness, DT, is ≦70% of the original thickness, OT. In some aspects of these embodiments, the densified thickness, DT, is between 70 and 40% of the original thickness, OT. In some aspects of these embodiments, the method further comprises interfacing the shape memory chemical mechanical polishing pad with a platen of a polishing machine. In some aspects of these embodiments, the method further comprises interfacing the shape memory chemical mechanical polishing pad with a platen of a polishing machine using at least one of a pressure sensitive adhesive and vacuum. In some aspects of these embodiments, the substrate comprises a semiconductor substrate. In some aspects of these embodiments, the substrate comprises a semiconductor wafer. In some aspects of these embodiments, the substrate comprises a series of patterned semiconductor wafers.

In some embodiments of the present invention, the method of polishing a substrate further comprises: providing a polishing medium at an interface between the polishing surface and the substrate.

In some embodiments of the present invention, the method of polishing a substrate further comprises: conditioning the polishing surface of the polishing layer. In some aspects of these embodiments, the conditioning comprises exposing at least a portion of the polishing layer proximate the polishing surface to an activating stimulus, wherein the portion of the polishing layer proximate the polishing surface exposed to the activating stimulus transitions from the densified state to a recovered state. In some aspects of these embodiments, the activating stimulus is selected from exposure to heat, light, a magnetic field, an electric field, water, and combinations thereof. In some aspects of these embodiments, the activating stimulus is exposure to heat. In some aspects of these embodiments, the activating stimulus is exposure to heat and the conditioning of the polishing surface of the polishing layer comprises raising the temperature of a portion of the polishing layer proximate the polishing surface to a temperature $\geq T_g$, wherein $T_g$ is the glass transition temperature for the shape memory matrix material. In some aspects of these embodiments, the temperature of a portion of the polishing layer proximate the polishing surface is heated to a temperature $\geq (T_g+10)°$ C. In some aspects of these embodiments, the temperature of a portion of the polishing layer proximate the polishing surface is heated to a temperature of $\geq (T_g+20)°$ C. In some aspects of these embodiments, conditioning of the polishing layer comprises heating a portion of the polishing layer $\leq 5\%$ of the actual thickness of the polishing layer proximate the polishing surface to a temperature $\geq$ the glass transition temperature for the shape memory matrix material, $T_g$. In some aspects of these embodiments, conditioning of the polishing layer comprises heating $\leq 2\%$ of the actual thickness of the polishing layer proximate the polishing surface to a temperature $\leq$ the glass transition temperature for the shape memory matrix material, $T_g$. In some aspects of these embodiments, conditioning of the polishing layer comprises heating $\leq 1\%$ of the actual thickness of the polishing layer proximate the polishing surface to a temperature $\geq$ the glass transition temperature for the shape memory matrix material, $T_g$. In some aspects of these embodiments, conditioning of the polishing layer comprises heating 0.1 to 5% of the actual thickness of the polishing layer proximate the polishing surface to a temperature $\geq$ the glass transition temperature for the shape memory matrix material, $T_g$. Application of heat to only a portion of the polishing layer proximate the polishing surface is sufficient to cause some of the shape memory matrix material in that portion of the polishing layer to transition to a recovered shape, while the shape memory matrix material in the remainder of the polishing layer remains in the programmed shape.

In some embodiments of the present invention, conditioning of the polishing surface of the polishing layer comprises conventional conditioning methods. In some aspects of these embodiments, conditioning of the polishing surface comprises abrading with a conditioning disk, for example, a diamond disk.

In some embodiments of the present invention, conditioning of the polishing surface of the polishing layer comprises a combination of conventional conditioning methods and exposure to an activating stimulus.

In the particular embodiments described herein in reference to the Figures, the activating stimulus is exposure to heat. Notwithstanding, given the teachings provided herein, one of ordinary skill in the art would know how to employ other activating stimuli such as, for example, exposure to light, a magnetic field, an electric field, and/or water.

In FIG. 1 there is provided a comparative depiction of an elevation view of a polishing layer of one embodiment of the present invention. In particular, FIG. 1 provides a comparison of a polishing layer in an original state 10 with an original thickness, OT, to the same polishing layer in a densified state 20 with a densified thickness, DT.

Figure 2:
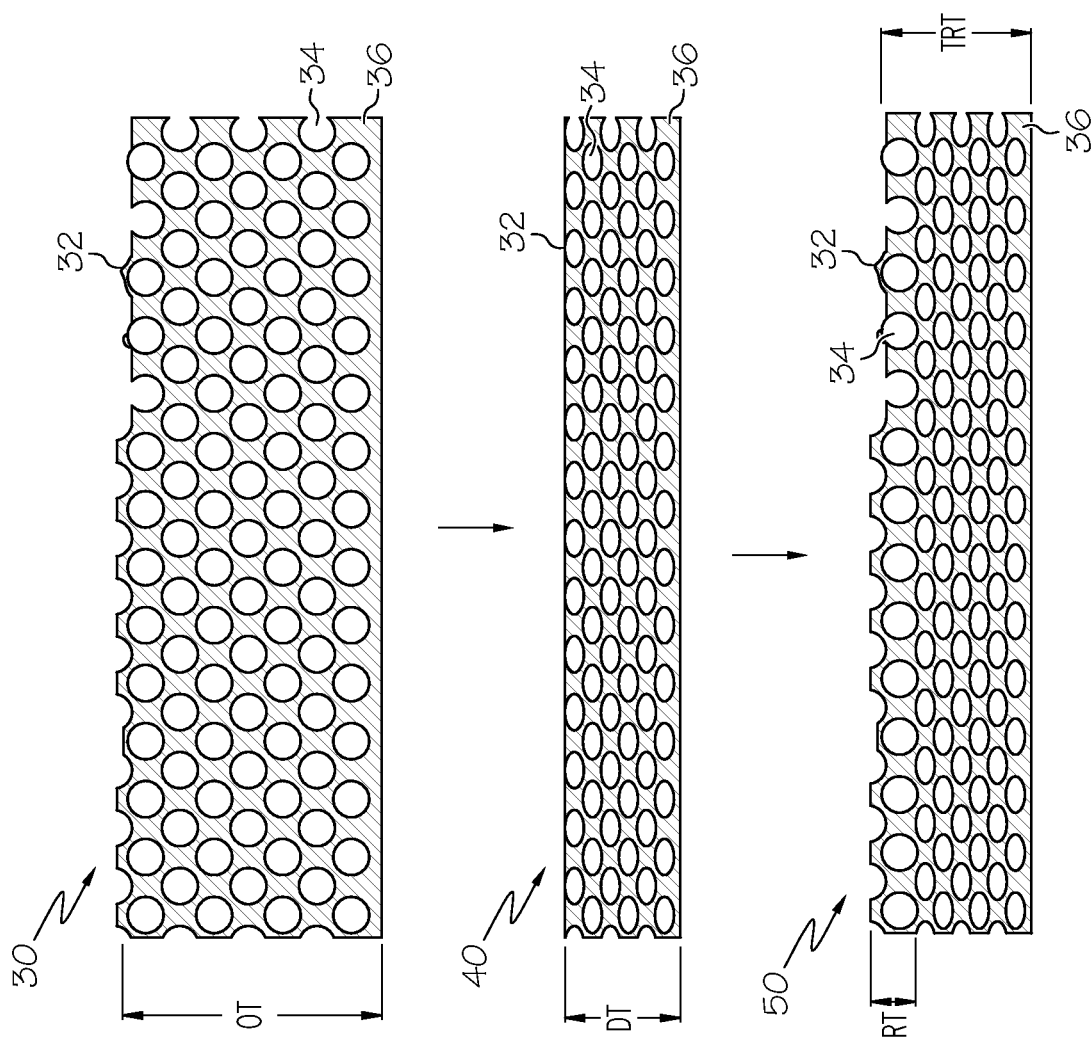
FIG. 2 is a comparative depiction of an elevation view of a polishing layer of the present invention in an original state, a densified state and a partially recovered state.

In FIG. 2 there is provided a comparative depiction of an elevation view of a polishing layer of one embodiment of the present invention. In particular, FIG. 2 provides a comparison of a polishing layer in an original state 30 with an original thickness, OT, to the same polishing layer in a densified state 40 with a densified thickness, DT, to the same polishing layer in a partially recovered state 50 with a total recovered thickness, TRT, and with the recovered portion proximate the polishing surface 32 having a recovered thickness, RT. The polishing layer depicted in FIG. 2 comprises a plurality of microelements 34 dispersed within a shape memory matrix material 36.

Figure 3:
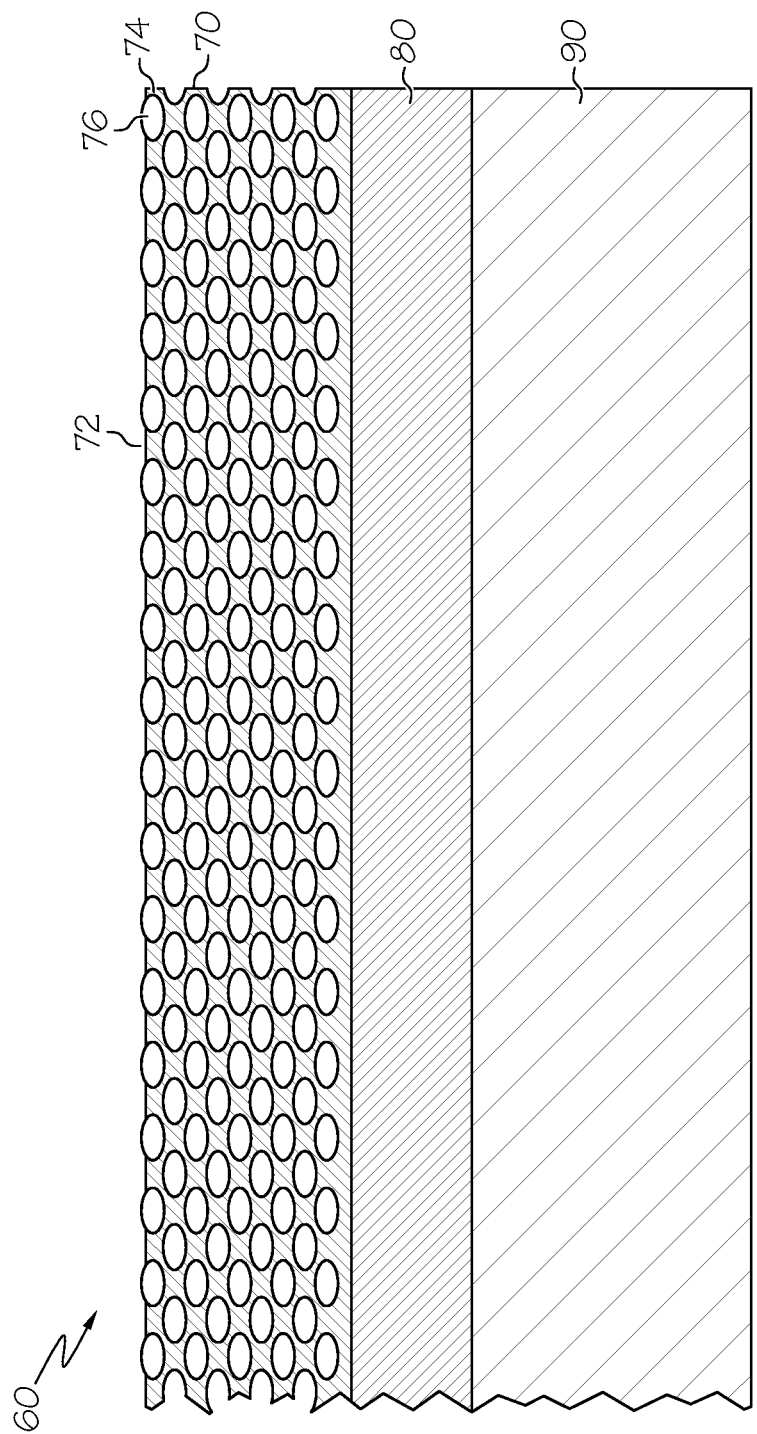
FIG. 3 is an elevation view of a shape memory chemical mechanical polishing pad of one embodiment of the present invention.

In FIG. 3 there is provided an elevation view of a shape memory chemical mechanical polishing pad of one embodiment of the present invention. In particular, the shape memory chemical mechanical polishing pad 60 in FIG. 3 comprises a polishing layer 70 with a polishing surface 72, wherein the polishing layer comprises a plurality of microelements 76 uniformly dispersed throughout a shape memory matrix material 74. The shape memory chemical mechanical polishing pad 60 in FIG. 3 further comprises a base layer 90 interfaced with the polishing layer 70. Specifically, the base layer 90 is adhered to the polishing layer 70 by an adhesive layer 80.

Figure 4:
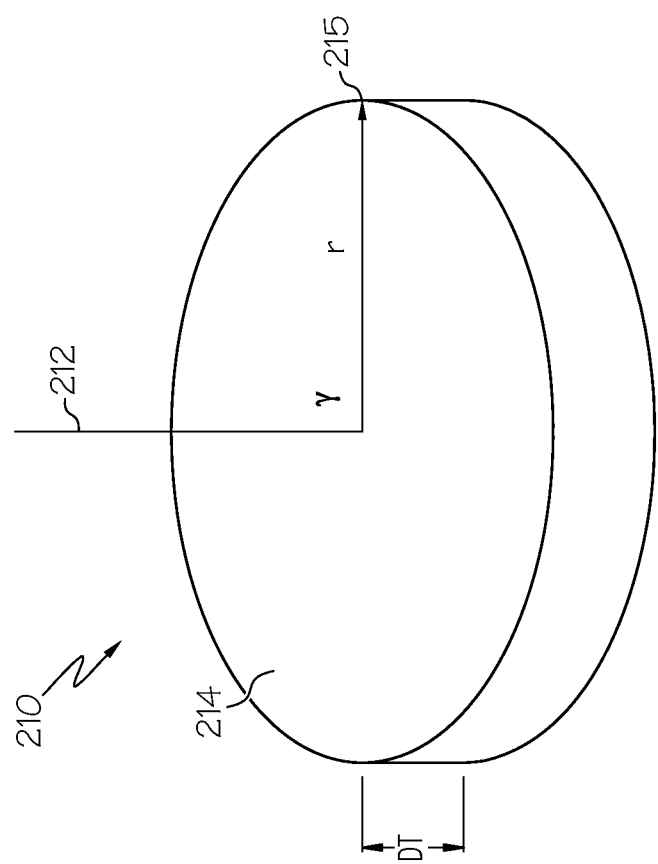
FIG. 4 is a side perspective view of a shape memory chemical mechanical polishing pad of one embodiment of the present invention.

In FIG. 4 there is provided a side perspective view of a shape memory chemical mechanical polishing pad of one embodiment of the present invention. In particular, FIG. 4 depicts a single layer shape memory chemical mechanical polishing pad 210 in a densified state having a densified thickness, DT. The shape memory chemical mechanical polishing pad 210 has a polishing surface 214 and a central axis 212. The polishing surface 214 has a substantially circular cross section with a radius r from the central axis 212 to the outer periphery of the polishing surface 215 in a plane at an angle γ to the central axis 212.

Figure 5:
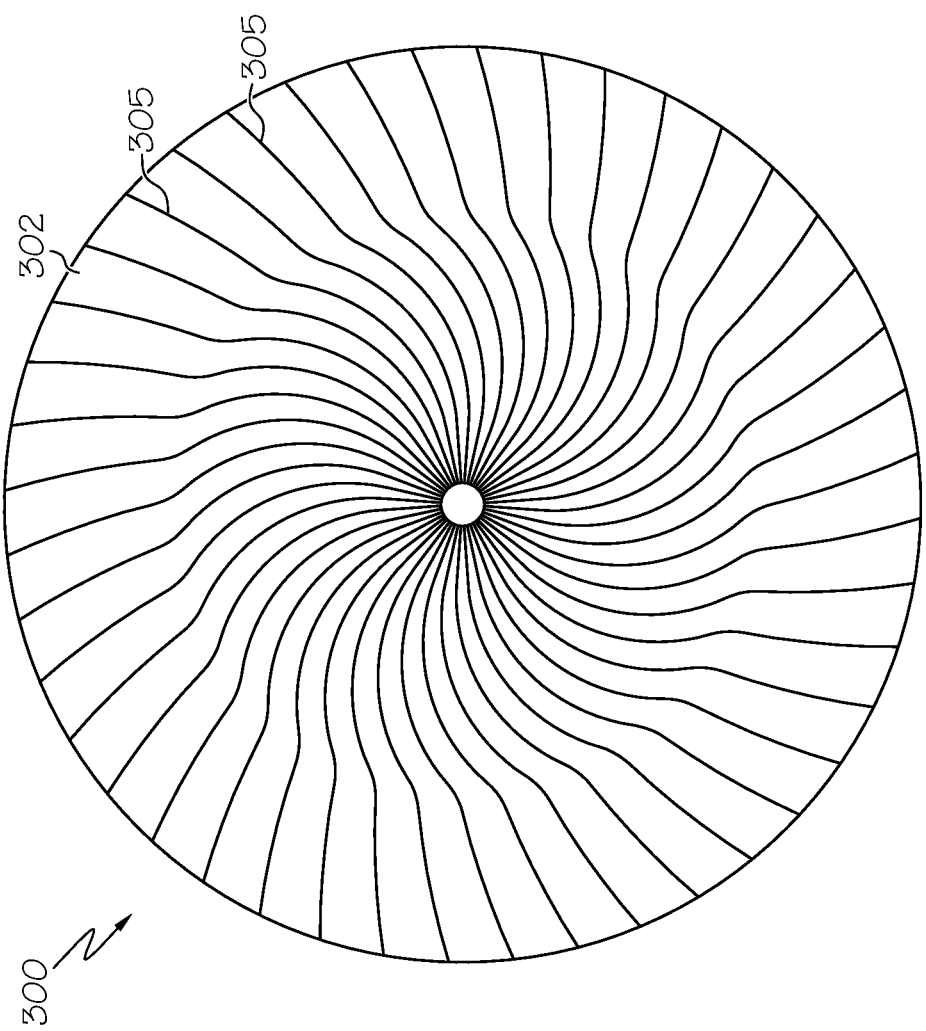
FIG. 5 is a top plan view of a shape memory chemical mechanical polishing pad of one embodiment of the present invention depicting a groove pattern in the polishing surface.

In FIG. 5 there is provided a top plan view of a shape memory chemical mechanical polishing pad of one embodiment of the present invention. In particular, FIG. 5 depicts a shape memory chemical mechanical polishing pad 300 having a polishing surface 302 with a groove pattern of a plurality of curved grooves 305.

Figure 6:
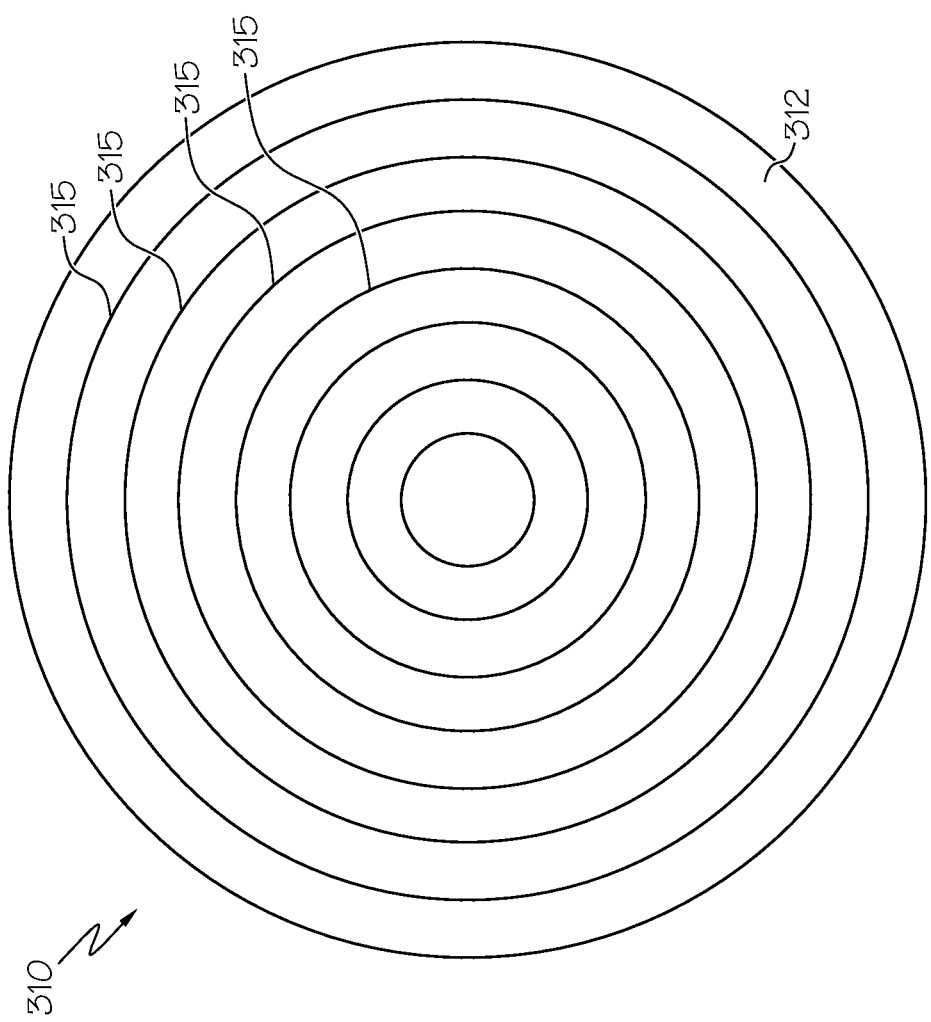
FIG. 6 is a top plan view of a shape memory chemical mechanical polishing pad of one embodiment of the present invention depicting a groove pattern in the polishing surface.

In FIG. 6 there is provided a top plan view of a shape memory chemical mechanical polishing pad of one embodiment of the present invention. In particular, FIG. 6 depicts a shape memory chemical mechanical polishing pad 310 having a polishing surface 312 with a groove pattern of a plurality of concentric circular grooves 315.

Figure 7:
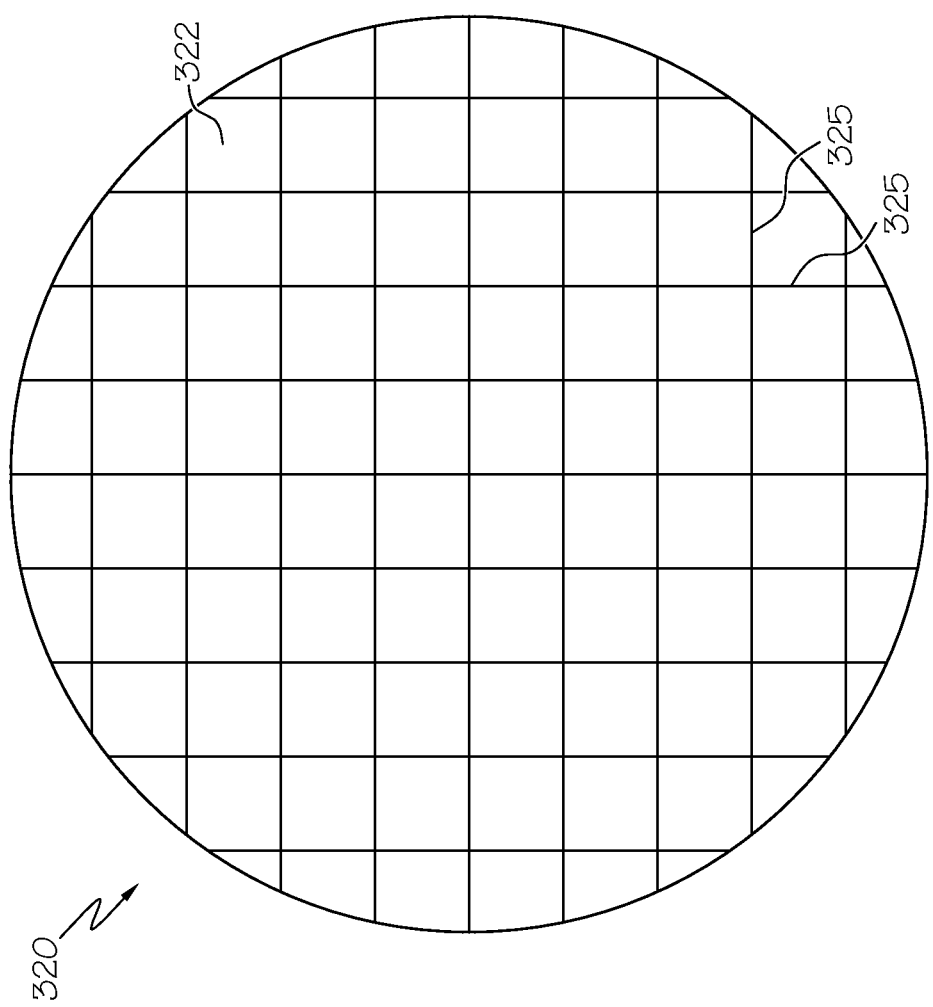
FIG. 7 is a top plan view of a shape memory chemical mechanical polishing pad of one embodiment of the present invention depicting a groove pattern in the polishing surface.

In FIG. 7 there is provided a top plan view of a shape memory chemical mechanical polishing pad of one embodiment of the present invention. In particular, FIG. 7 depicts a shape memory chemical mechanical polishing pad 320 having a polishing surface 322 with a groove pattern of a plurality of linear grooves 325 in an X-Y grid pattern.

Figure 8:
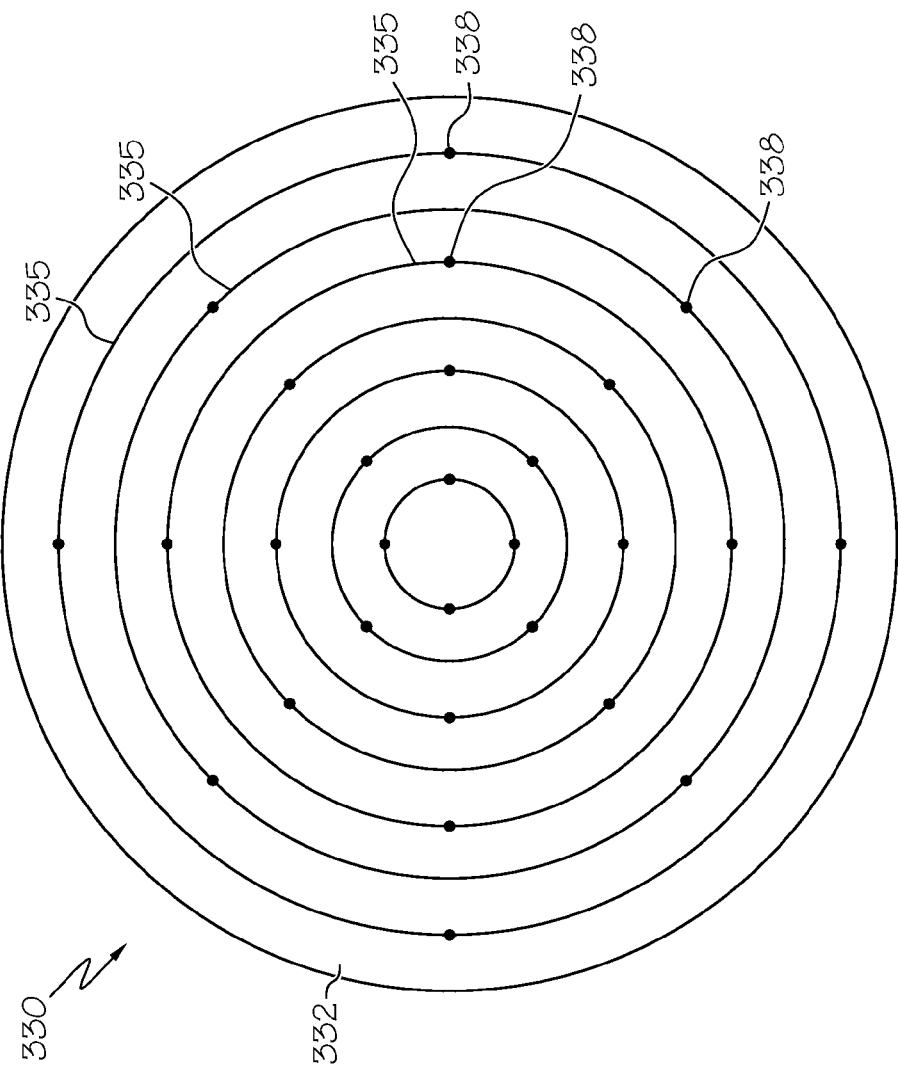
FIG. 8 is a top plan view of a shape memory chemical mechanical polishing pad of one embodiment of the present invention depicting a combination of perforations and groove pattern in the polishing surface.

In FIG. 8 there is provided a top plan view of a shape memory chemical mechanical polishing pad of one embodiment of the present invention. In particular, FIG. 8 depicts a shape memory chemical mechanical polishing pad 330 having a polishing surface 332 with a combination of a plurality of perforations 338 and a plurality of concentric circular grooves 335.

Figure 9:
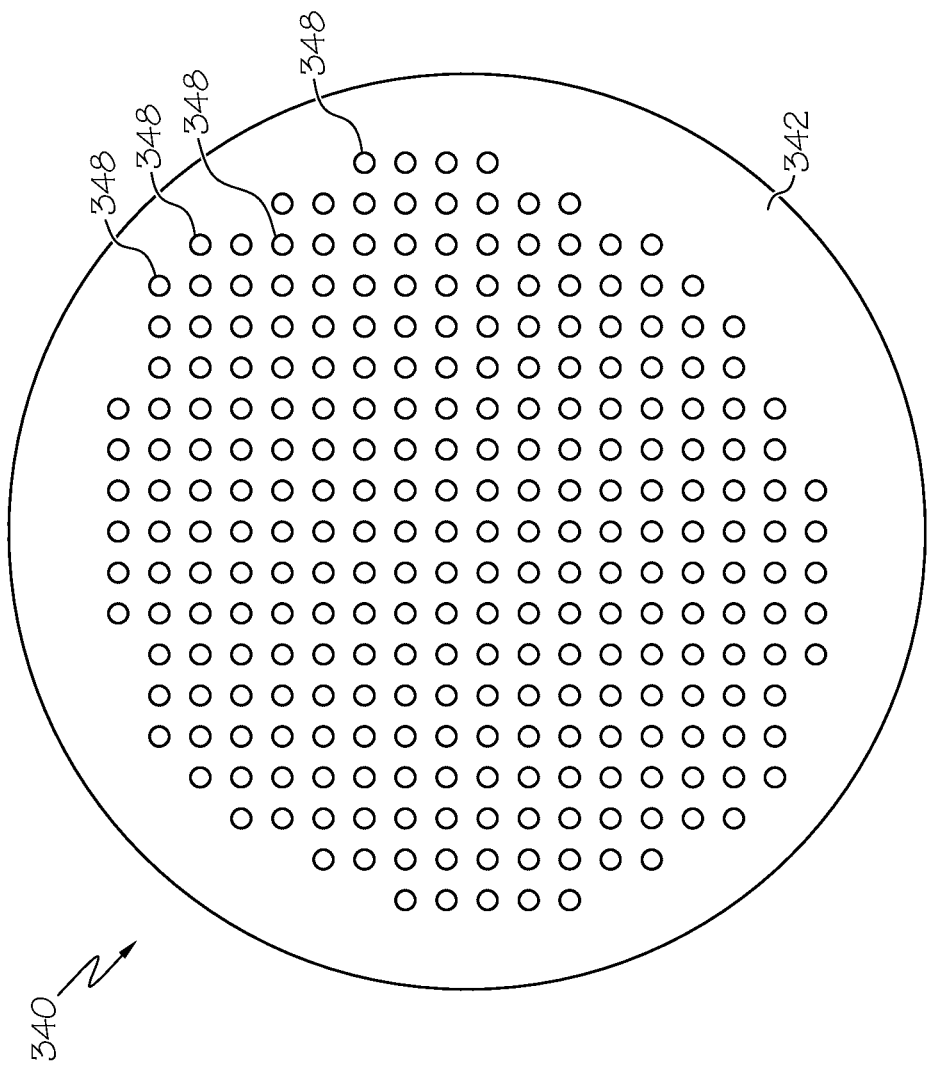
FIG. 9 is a top plan view of a shape memory chemical mechanical polishing pad of one embodiment of the present invention depicting a plurality of perforations in the polishing surface.

In FIG. 9 there is provided a top plan view of a shape memory chemical mechanical polishing pad of one embodiment of the present invention. In particular, FIG. 9 depicts a shape memory chemical mechanical polishing pad 340 having a polishing surface 342 with a plurality of perforations 348.

Figure 10:
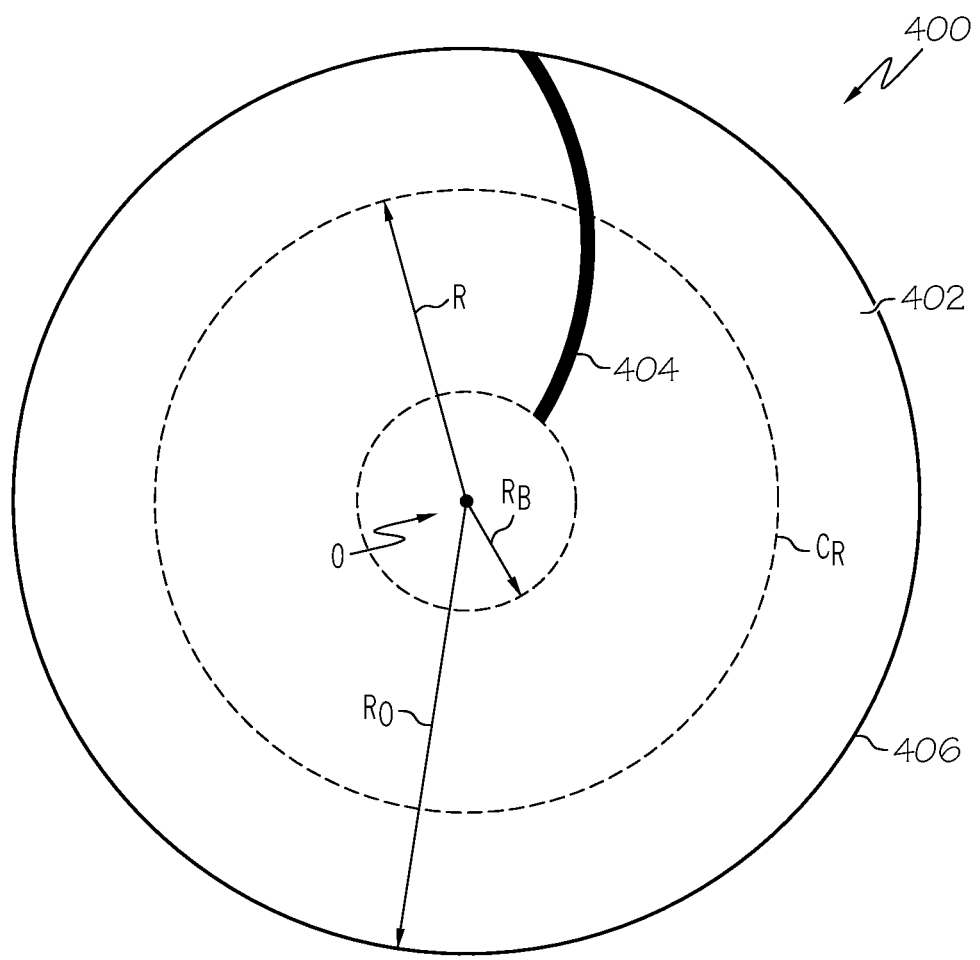
FIG. 10 is a top plan view of a shape memory chemical mechanical polishing pad of one embodiment of the present invention with a groove pattern in the polishing surface.
Figure 11:
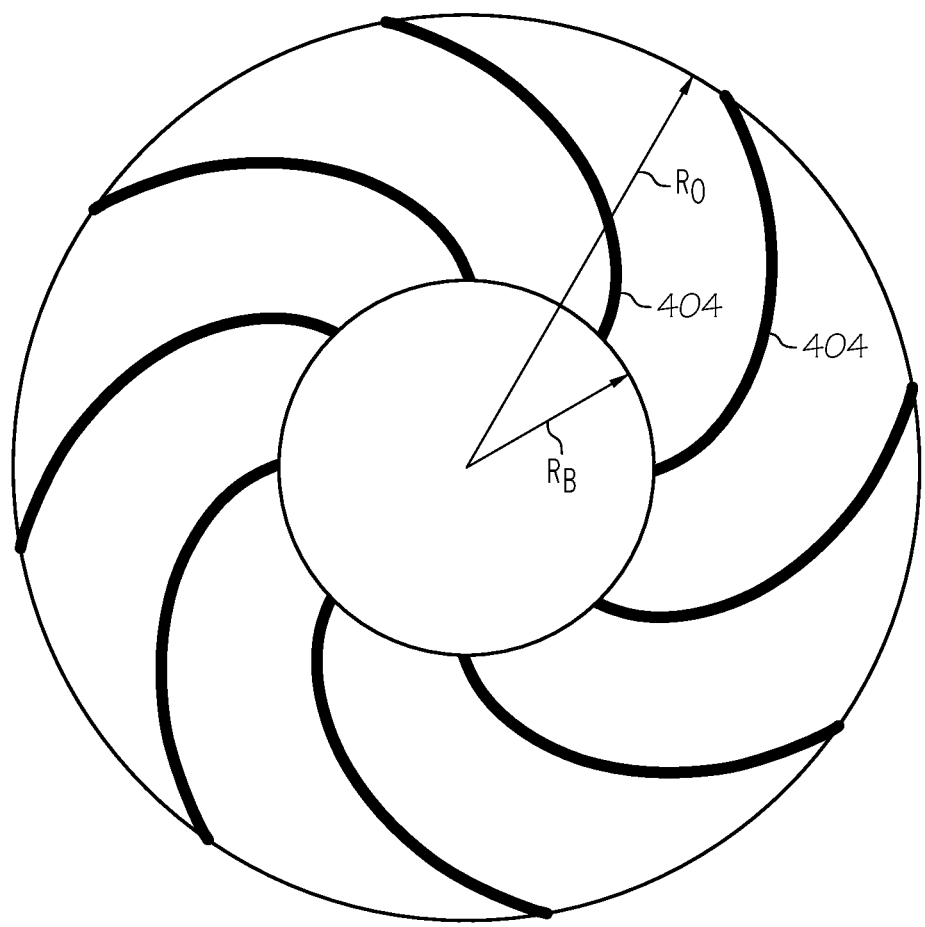
FIG. 11 is a top plan view of a shape memory chemical mechanical polishing pad of one embodiment of the present invention with a groove pattern in the polishing surface, wherein the polishing pad exhibits a 24 inch pad outer radius $R_O$ and a 10 inch base radius $R_B$; and 8 curved grooves.
Figure 12:
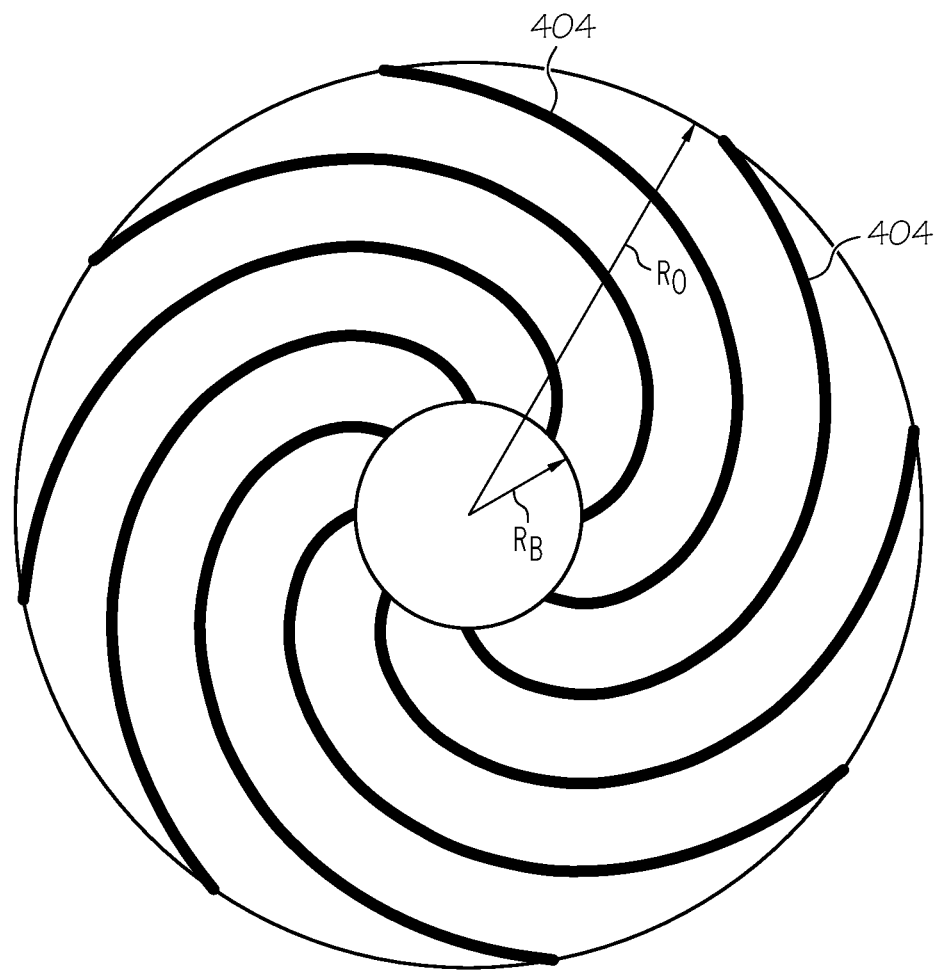
FIG. 12 is a top plan view of a shape memory chemical mechanical polishing pad of one embodiment of the present invention with a groove pattern in the polishing surface, wherein the polishing pad exhibits a 24 inch pad outer radius $R_O$; a 6 inch base radius $R_B$; and 8 curved grooves.
Figure 13:
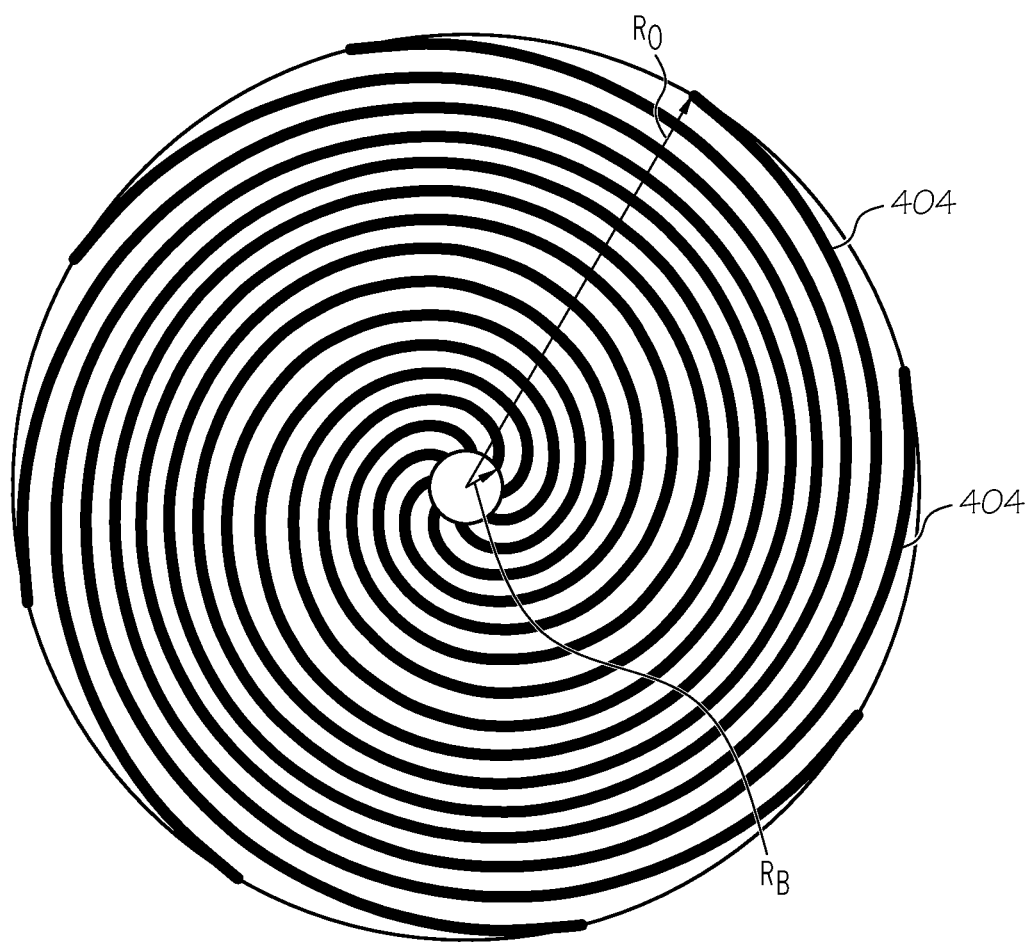
FIG. 13 is a top plan view of a shape memory chemical mechanical polishing pad of one embodiment of the present invention with a groove pattern in the polishing surface, wherein the polishing pad exhibits a 24 inch pad outer radius $R_O$ and a 2 inch base radius $R_B$.
Figure 14:
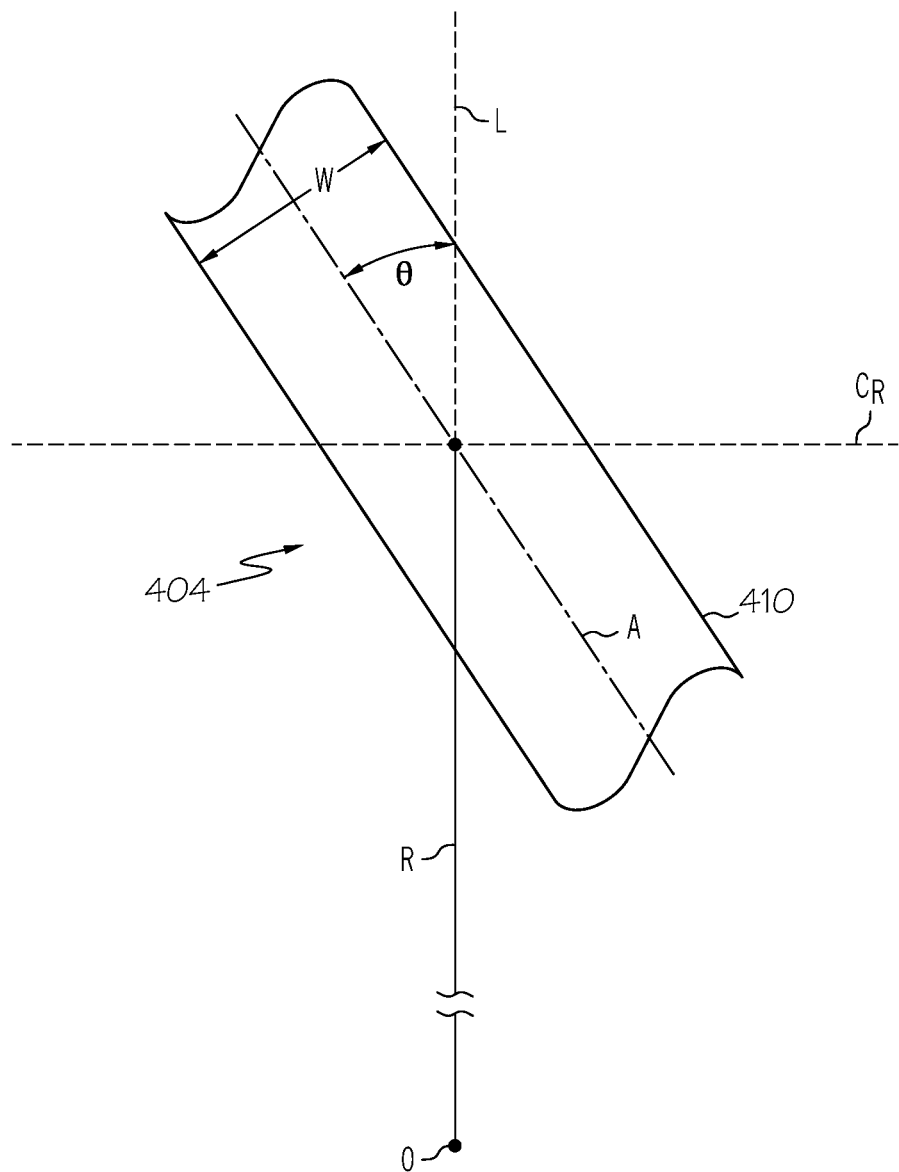
FIG. 14 is a close-up view of a groove segment of groove 404 of FIG. 10.

FIG. 10 provides a top plan view of a shape memory chemical mechanical polishing pad 400 of some embodiments of the present invention, wherein the polishing pad 400 has a macrotexture comprising a groove pattern that comprises at least one groove 404. The polishing pad 400 has an outer radius $R_O$ and a polishing surface 402 with at least one groove 404 formed therein. Although only a single groove 404 is depicted in FIG. 10, the groove pattern can comprise two or more grooves 404. (See, e.g., FIGS. 11-13). The polishing pad radius R is measured from an origin O at the center of the polishing surface 402. A circle $C_R$ (dashed line) drawn at radius R with a circumference $2\pi R$ is also shown in FIG. 10. The outer radius of polishing pad 400 is $R_O$. Groove 404 extends from base radius $R_B$ to outer radius $R_O$, which defines the outer periphery 406 of polishing surface 402. In some aspects of these embodiments, the groove(s) 404 extend from base radius $R_B$ to outer periphery 406 (as depicted in FIGS. 10-13). In some aspects of these embodiments, the groove(s) 404 extend from a point between the origin O and the base radius $R_B$ to outer periphery 406. In some aspects of these embodiments, the groove(s) 404 extend from origin O to outer periphery 406. FIG. 14 depicts a close-up view of a groove segment of groove 404 of FIG. 10, showing a small differential segment 410 of groove 404. At a given radius R, groove 404 has a given width W and a central axis A that forms an angle θ ("groove angle") with respect to a radial line L connecting the origin O to the given radius R. In some aspects of these embodiments, the shape memory chemical mechanical polishing pad has a macrotexture comprising a groove pattern, wherein CF remains within 25%, preferably within 10%, more preferably within 5% of its average value as a function of the polishing pad radius R in an area extending from an outer radius $R_O$ of the polishing surface a majority distance to origin O. In some aspects of these embodiments, the shape memory chemical mechanical polishing pad has a macrotexture comprising a groove pattern, wherein CF remains within 25%, preferably within 10%, more preferably within 5% of its average value as a function of polishing pad radius R in an area extending from base radius $R_B$ to outer radius $R_O$.

Figure 15:
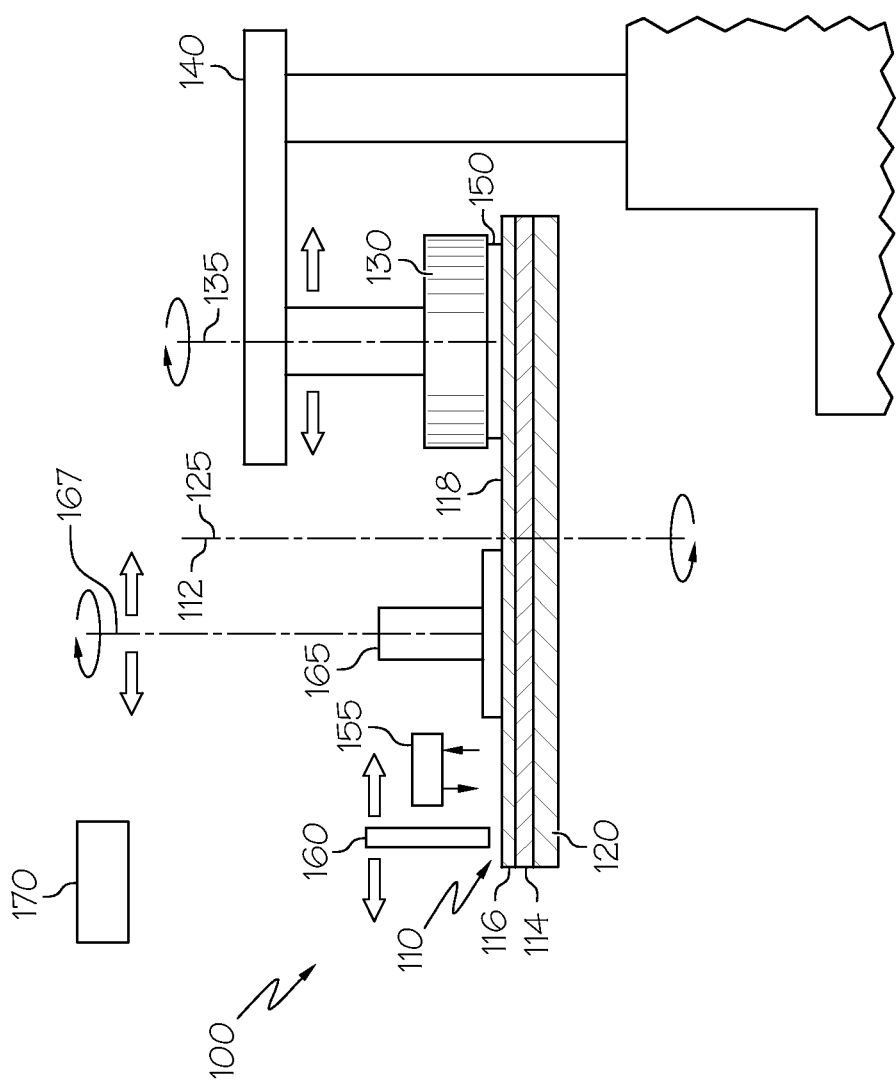
FIG. 15 is a depiction of a polishing machine utilizing a shape memory chemical mechanical polishing pad of the present invention to polish a semiconductor wafer.

In FIG. 15 there is provided a depiction of a polishing machine utilizing a shape memory chemical mechanical polishing pad of one embodiment of the present invention to polish a semiconductor wafer. In particular, FIG. 15 depicts a polishing apparatus 100 with a shape memory chemical mechanical polishing pad 110 having a central axis 112, a polishing layer 116 with a polishing surface 118 and a base layer 114. FIG. 15 further depicts a polishing platen 120 to which the base layer 114 is affixed. The polishing platen 120 has a central axis 125 that corresponds with the central axis 112 of the polishing pad 110. The polishing apparatus 100 further comprises a wafer carrier 130 having a central axis 135. The wafer carrier 130 carries semiconductor wafer 150. The wafer carrier 130 is mounted to a translational arm 140 for moving the wafer carrier laterally relative to the polishing pad 110. The wafer carrier 130 and the platen 120 (with polishing pad 110 attached thereto) are designed to move rotationally about their respective central axis and to facilitate dynamic contact between the polishing surface 118 and the semiconductor wafer 150. A monitor 155 is positioned (optionally moveably positioned) relative to the polishing surface to facilitate the measurement of at least one polishing pad property selected from a polishing pad thickness and a groove depth. A source 160 is moveably positioned in proximity to the polishing surface 118 to facilitate the selective exposure of the polishing layer to an activating stimulus such that the exposed portion of the polishing layer transitions from a densified state to a recovered state. A conditioning apparatus 165 provides abrasive conditioning for the polishing surface 118. A controller 170 is in active communication with the monitor 155, the source 160 and the conditioning apparatus 165; and is programmed to maintain a consistent polishing pad thickness and/or groove depth.

Figure 16:
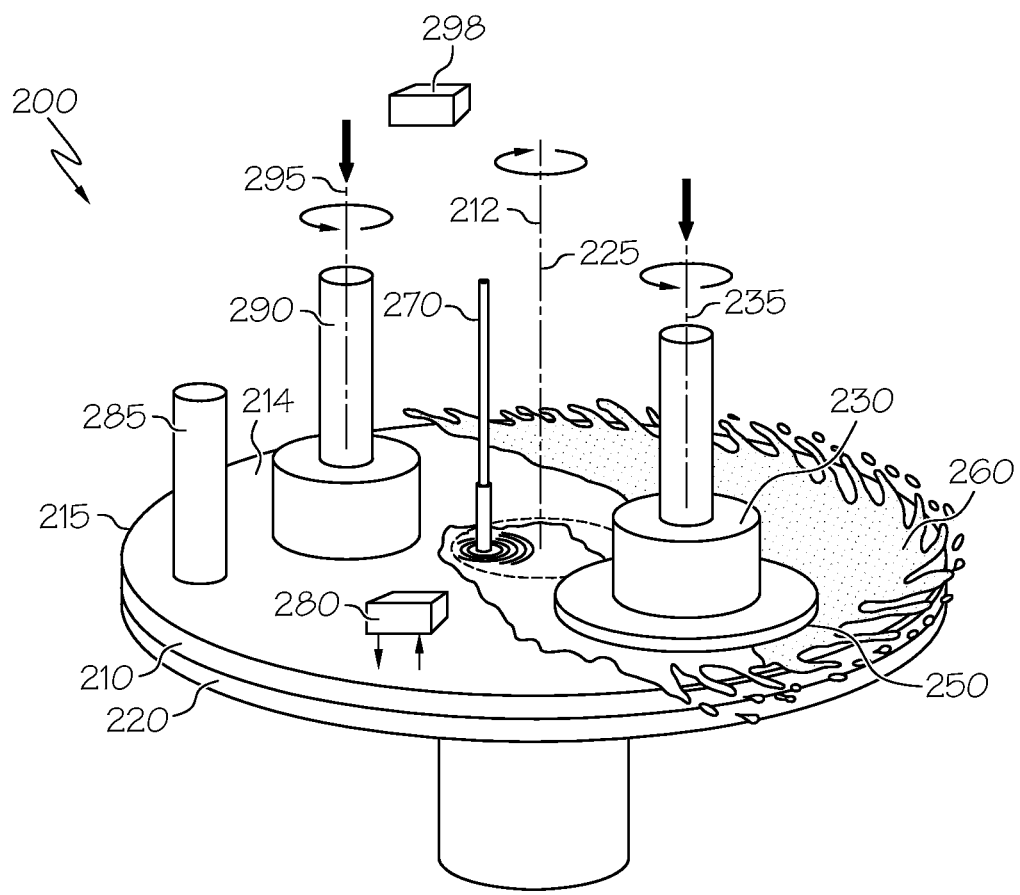
FIG. 16 is a depiction of a polishing apparatus utilizing a shape memory chemical mechanical polishing pad of the present invention in combination with a polishing slurry to polish a semiconductor wafer.

In FIG. 16 there is provided a depiction of a polishing apparatus utilizing a shape memory chemical mechanical polishing pad of one embodiment of the present invention in combination with a polishing medium (e.g., a polishing slurry). In particular, FIG. 16 depicts an apparatus 200 comprising a single layer shape memory chemical mechanical polishing pad 210 with a polishing surface 214 and an outer periphery 215. The polishing pad 210 is interfaced with a platen 220. The polishing pad 210 has a central axis 212 which corresponds with a central axis 225 of the platen 220. The apparatus 200 further comprises a wafer carrier 230 with a central axis 235. The wafer carrier 230 holds a semiconductor wafer 250. The apparatus 200 further comprises a polishing medium 260 and a slurry dispenser 270 for dispensing the polishing medium onto the polishing surface 214. During polishing of the semiconductor wafer 250, the platen 220 and the polishing pad 210 are rotated about their respective central axis and the wafer carrier is rotated about its central axis. During polishing, the polishing pad and the wafer are placed in dynamic contact with one another and the polishing medium is introduced to the system such that it may pass between the semiconductor wafer and the polishing surface of the polishing pad. The monitor 280 is positioned (optionally moveably positioned) relative to the polishing surface to facilitate the measurement of at least one polishing pad property selected from a polishing pad thickness and a groove depth. The source 285 is moveably positioned in proximity to the polishing surface 214 to facilitate the selective exposure of the polishing layer to an activating stimulus such that the exposed portion of the polishing layer transitions from a densified state to a recovered state. The conditioning apparatus 290 provides abrasive conditioning for the polishing surface 214. The controller 298 is in active communication with the monitor 280, the source 285 and the conditioning apparatus 290; and is programmed to maintain a consistent polishing pad thickness and/or groove depth.

Some embodiments of the present invention will now be described in detail in the following Examples.

EXAMPLE 1

Shape Memory Polishing Pad

Test samples were prepared from a commercially available filled polyurethane polishing pad (available from Rohm and Haas Electronic Materials CMP Inc. as IC1000™) The test samples comprised circular discs with a diameter of about 12.7 mm, which were die-stamped out of polishing pad.

EXAMPLE 2

Shape Memory Polishing Pad Material Preparation

A shape memory polymeric matrix material was prepared by mixing 227 grams of glycerol propoxylate (average Mn~266); 279 grams of polytetrahydrofuran (average Mn~650), and; 494 grams of polycarbodiimide-modified diphenylmethane diisocyanate (available from The Dow Chemical Company as Isonate® 143L); at about 50° C. and atmospheric pressure. To this mixture was then blended 18 grams of hollow elastic polymeric microspheres (available from Akso Nobel as Expancel® 551DE) at 2000 rpm using a non-contact planetary high shear mixer to evenly distribute the microspheres in the shape memory matrix material. The final mixture was then poured between two flat glass surfaces 2.54 mm apart and the ~254 mm diameter pour sheet formed was permitted to gel for about 10 minutes.

The 2.54 mm thick pour sheet along with the glass surfaces was then placed in a curing oven and cured for about 16-18 hours at about 105° C. The cured sheet was then cooled for about 8 hours at room temperature until the sheet temperature was about 25° C.

EXAMPLE 3

Shape Memory Polishing Pad Material Preparation

A shape memory polymeric matrix material was prepared by mixing 216 grams of glycerol propoxylate (average $M_n$~266); 315 grams of poly(caprolactone)diol (average $M_n$~775), and; 469 grams of polycarbodiimide-modified diphenylmethane diisocyanate (available from The Dow Chemical Company as Isonate® 143L); at about 50° C. and atmospheric pressure. To this mixture was then blended 18 grams of hollow elastic polymeric microspheres (available from Akzo Nobel as Expancel® 551DE) at 2000 rpm using a non-contact planetary high shear mixer to evenly distribute the microspheres in the shape memory matrix material. The final mixture was then poured between two flat glass surfaces 2.54 mm apart and the ~254 mm diameter pour sheet formed was permitted to gel for about 10 minutes. The sheet was cured as in Example 2.

EXAMPLE 4

Storage Modulus vs Temperature Measurements

Figure 17:
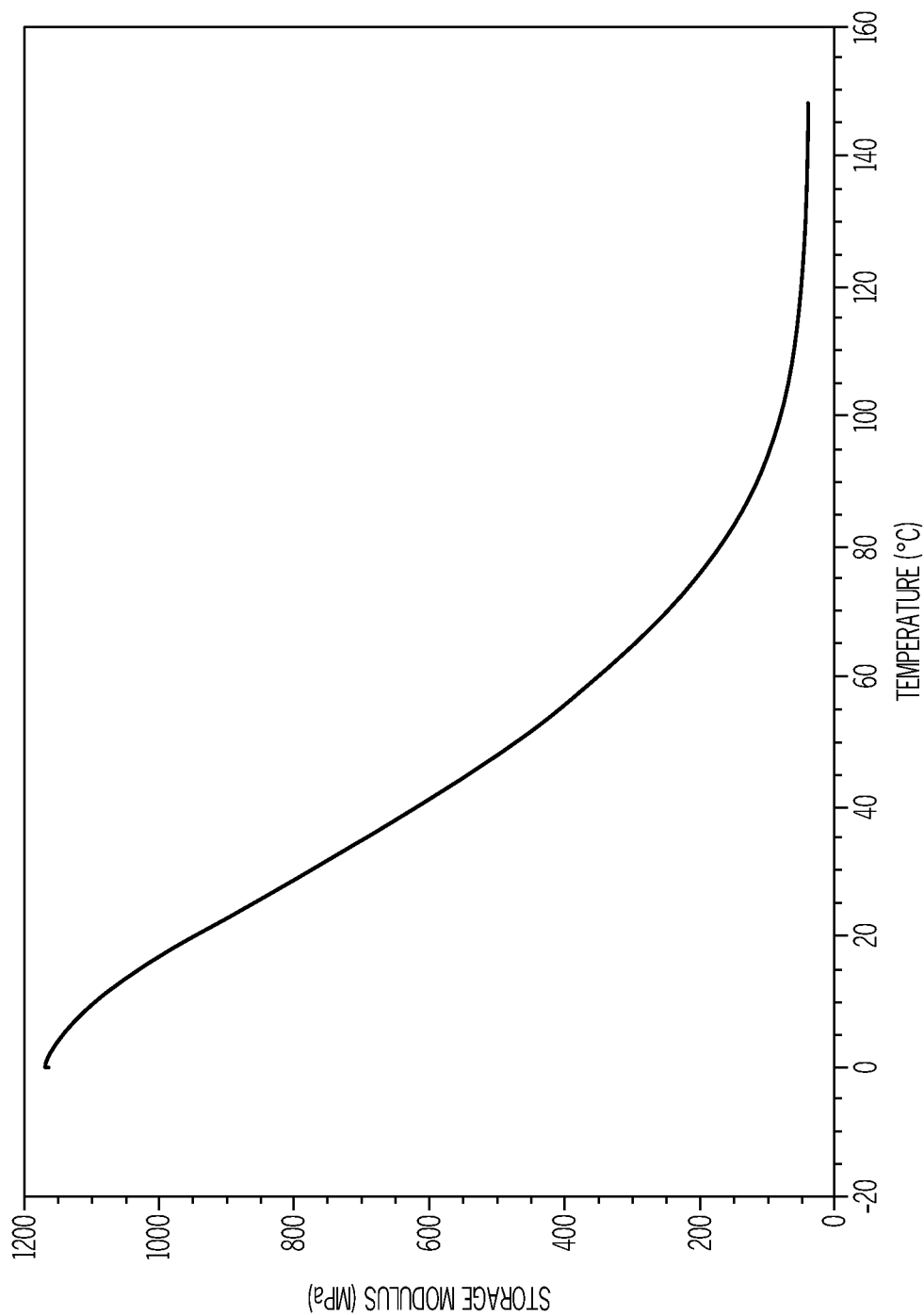
FIG. 17 is a graph providing a storage modulus versus temperature curve for the composition used in commercial IC1000™ polishing pads.

A storage modulus in (MPa) versus temperature in (° C.) curve was plotted for the shape memory matrix material used in commercial IC1000™ polishing pads from Rohm and Haas Electronic Materials CMP Inc. (but without addition of Expancel® material) using a dynamic mechanical analyzer (DMA, TA Instruments Q800 model). The plotted curve is provided in FIG. 17.

EXAMPLE 5

Storage Modulus vs Temperature Measurements

Figure 18:
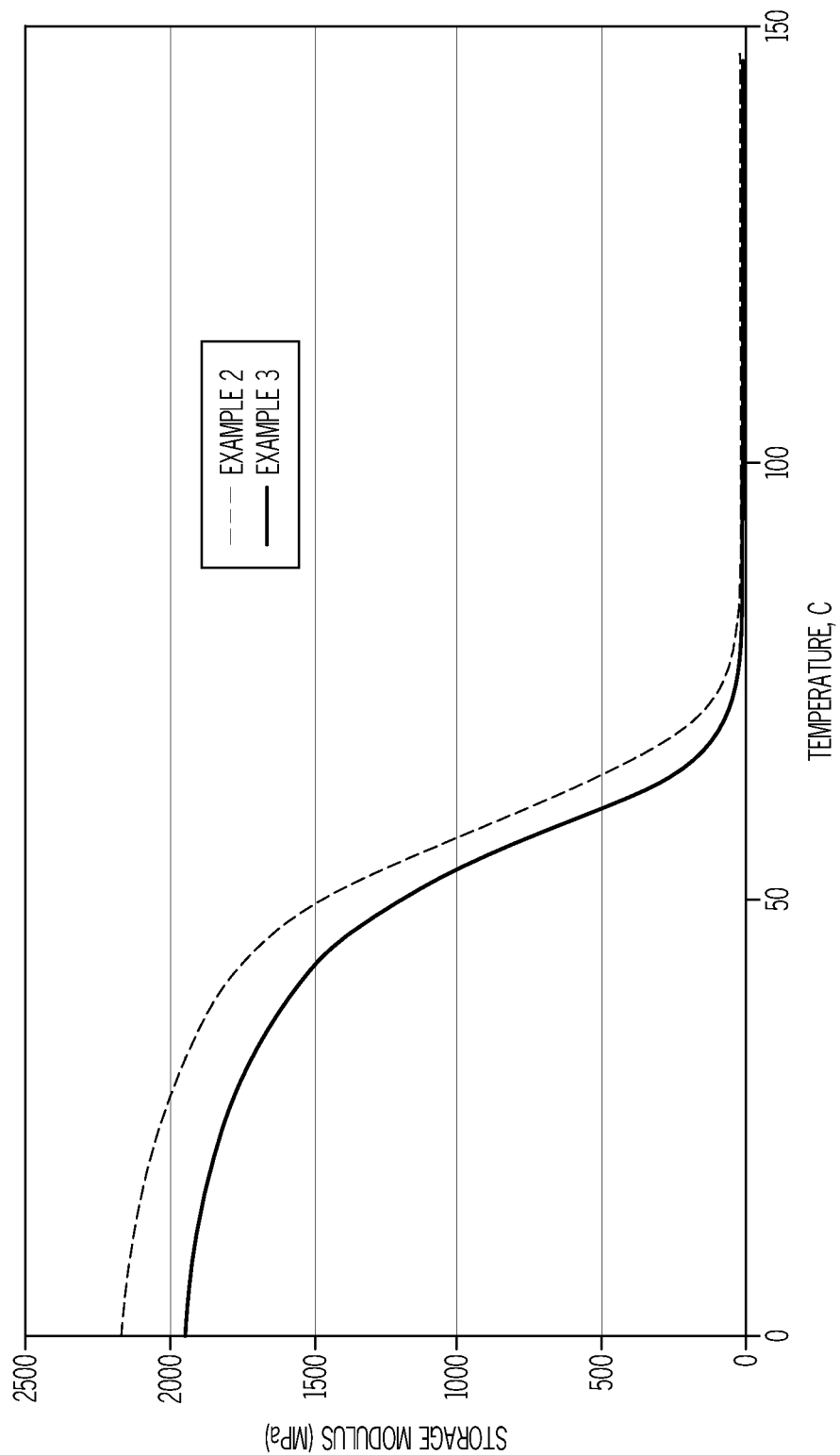
FIG. 18 is a graph providing storage modulus versus temperature curves for two shape memory matrix materials.

Storage modulus in (MPa) versus temperature in (° C.) was plotted for the shape memory matrix materials prepared as in Examples 2 and 3 (but without addition of Expancel® material) using a mechanical analyzer (DMA, TA Instruments Q800 model). The plotted curves are provided in FIG. 18.

EXAMPLE 6

Preparation of Polishing Pad in Densified State

Sample shape memory chemical mechanical polishing pad samples prepared according to Example 1 were placed between a 2" diameter top and bottom platens of an Instron Tester. A heated chamber, whose inside temperature was controllable, enclosed the space spanning the platens and the sample pads. The sample pads were heated to 120° C. for 20 minutes and an axial force was applied to the sample pads using the platens. This axial force imposed a nominal pressure on the sample pads, sufficient to compress the sample pads to about 50% of there original thickness. The nominal pressure imposed on the sample pads was around 1,000-5,000 psi. While maintaining the pressure, the sample pads were cooled to room temperature setting the shape memory matrix material therein to a programmed shape and providing the sample pads in a densified state.

EXAMPLE 7

Providing Polishing Pads in Densified State 12.5 mm diameter sample pads were punched out of the sheets produced according to Examples 2 and 3. The sample pads were then placed between the 2" diameter top and bottom platens of an Instron Tester. A heated chamber, whose inside temperature was controllable, enclosed the space spanning the platens and the sample pads. The sample pads were then heated to 90° C. for 20 minutes and an axial force was applied to the sample pads using the platens. This axial force imposed a nominal pressure on the sample pads, sufficient to compress the sample pads to about 50% of there original thickness. The pressure imposed on the sample pads by the axial force was around 1,000-5,000 psi. While maintaining this imposed pressure, the sample pads were cooled to room temperature, setting the shape memory material in the sample pads in a programmed state and providing sample pads in a densified state.

EXAMPLE 8

Recovery of Polishing Pads to Recovered State

The polishing pad samples in a densified state prepared according to Example 6 were heated in an oven at 120° C. for 10-20 minutes. The actual thickness of each of the polishing pad samples was then measured. Each of the polishing pad samples were observed to have transitioned to a recovered state with a maximum total recovered thickness of >99% of their original thickness.

EXAMPLE 9

Recovery of Polishing Pads to Recovered State

The polishing pad samples in a densified state prepared according to Example 7 were heated in an oven at 90° C. for 10-20 minutes. The actual thickness of each of the polishing pad samples was then measured. Each of the polishing pad samples were observed to have transitioned to a recovered state with a maximum total recovered thickness of >99% of their original thickness.

EXAMPLE 10

Preparation of Shape Memory Polishing Pad in Densified State

A 203 mm diameter shape memory polishing pad was punched out of a commercial IC1000™ polishing pad. The shape memory polishing pad was then placed between two 254 mm dia and 12.7 mm thick flat hardened steel plates, and placed over the bottom platen of a 150 ton Hannifin, 37"×36" down-acting, 4-post hydraulic press. The top and bottom platens were electrically heated for over 60 minutes until the shape memory polishing pad reached a temperature of 120° C. The shape memory polishing pad was then compressed to about 50% of the original thickness under an axial force imposing a pressure on the shape memory polishing pad of 1,000 to 5,000 psi. While maintaining this imposed pressure, the shape memory polishing pad was cooled to room temperature, setting the shape memory material therein to a programmed shape and providing a shape memory polishing pad in a densified state.

EXAMPLE 11

Polishing with Shape Memory Polishing Pad Using Thermal Conditioning

The following experiments were performed on a chemical mechanical desk top polisher from Center for Tribology Inc. The polisher was set with a downforce of 2.4 psi, a polishing solution flow rate of 50 cc/min, a platen speed of 160 RPM and a carrier speed of 160 RPM. The polishing medium used was EPL2362 slurry for copper CMP available from Rohm and Haas Electronic Materials CMP Inc. The wafers used in these experiments were 100 mm silicon substrate wafers with 15,000 Angstroms thick layer of electroplated copper available from SilyB. The wafers were polished to remove copper. The copper removal rates in (Å/min) reported herein were determined using wafer weight loss measurements using a submilligram analytical balance (AINSWORTH Model #CC-204) after polishing the wafer for 2 minutes under the above conditions.

Figure 19:
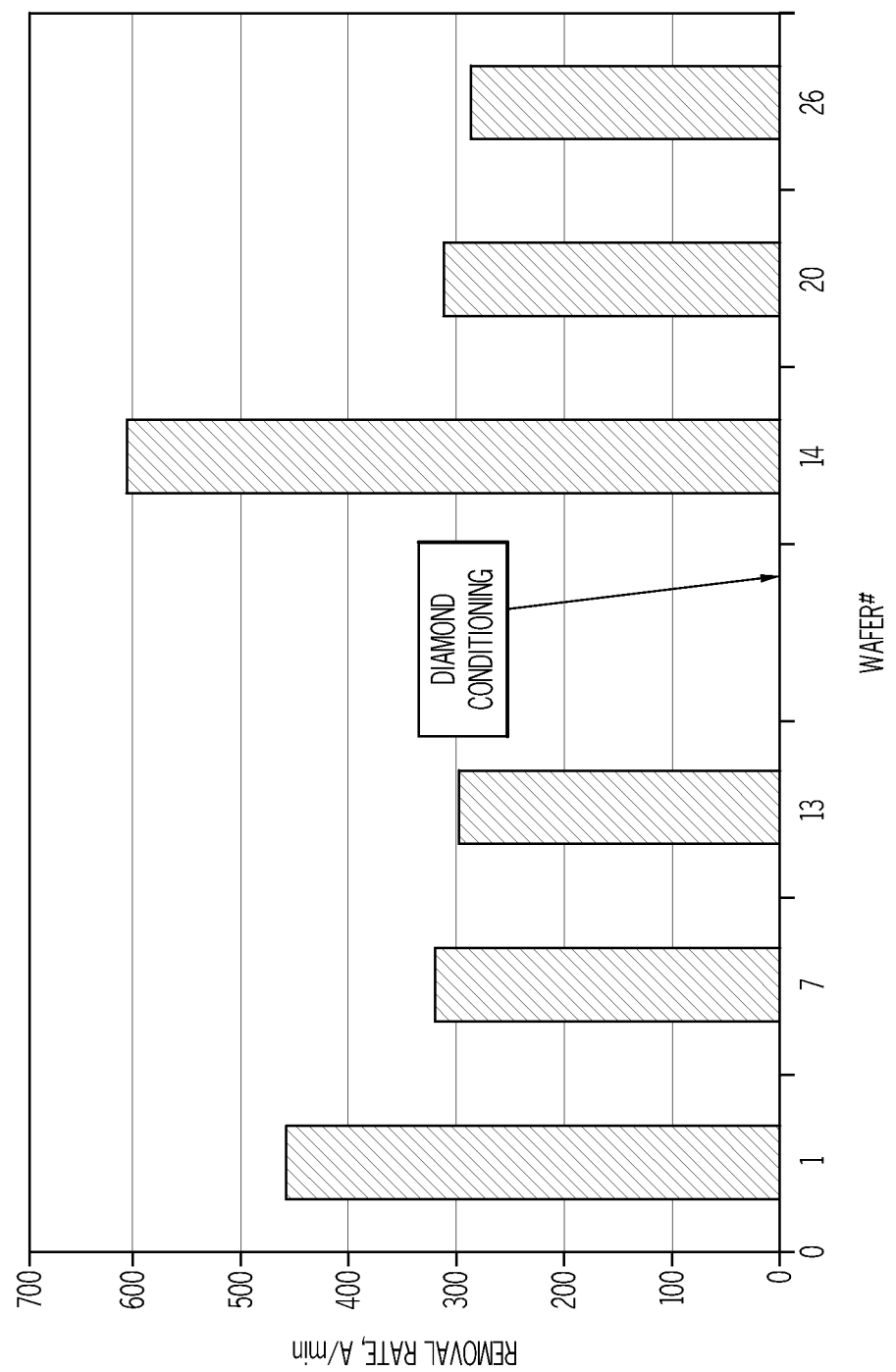
FIG. 19 is a graphical representation of the removal rate versus the number of wafers polished using a commercial IC1000™ polishing pad in an original state using diamond disk conditioning.

Polishing tests were performed using 203 mm diameter control pad die cut from a commercial IC1000™ polishing pad. The control pad was used in there original state (i.e., they were not transitioned to a densified state). Note that after polishing 13 wafers, the surface of the control pad was regenerated using diamond disk conditioning. The removal rate versus wafer # data for the polishing tests performed using the control pad in the original state with diamond disk conditioning are provided herein in FIG. 19.

Figure 20:
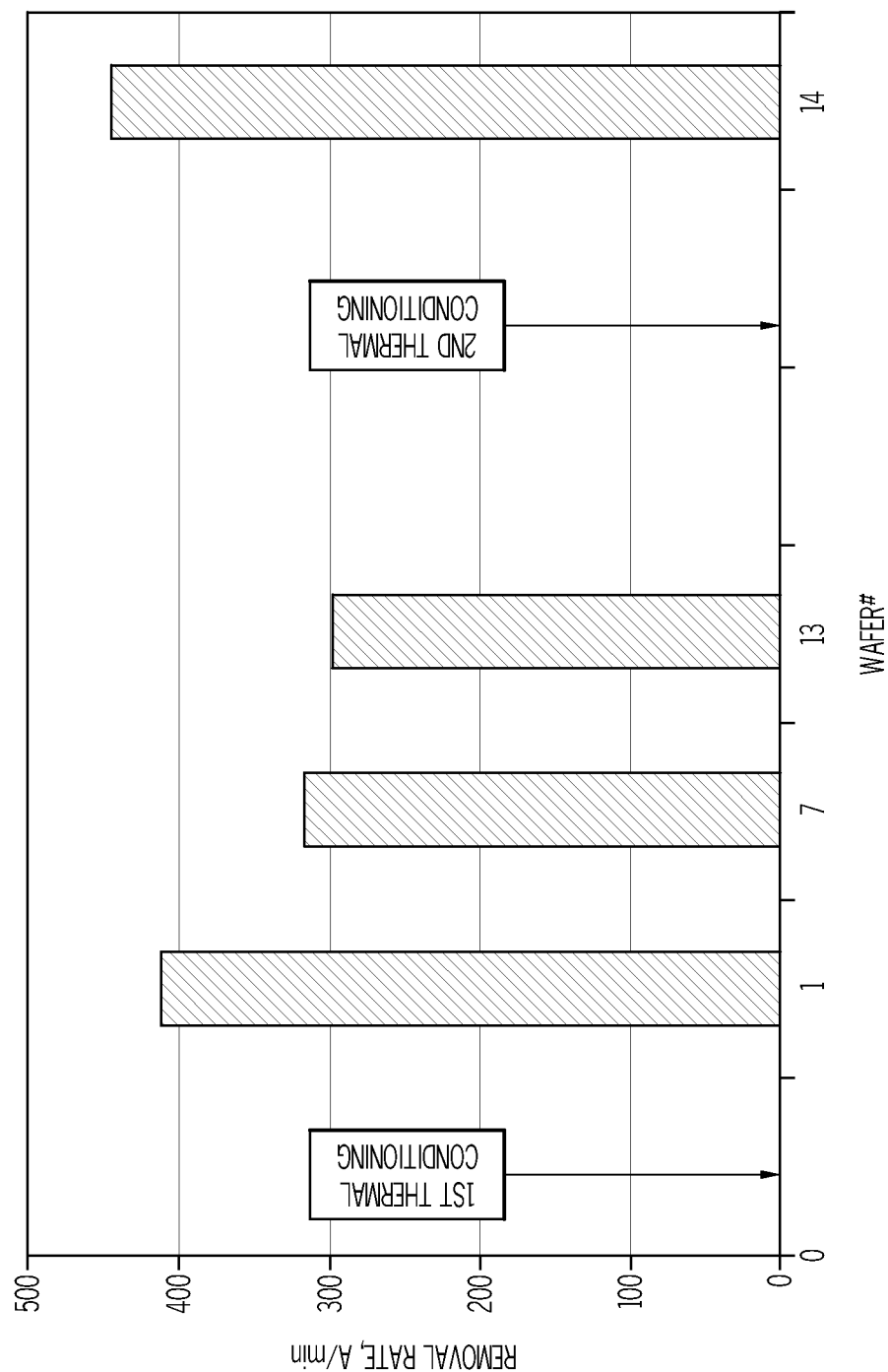
FIG. 20 is a graphical representation of the removal rate versus the number of wafers polished using an IC1000™ polishing pad in a densified state using thermal conditioning.

Polishing tests were then performed using commercial IC1000™ polishing pad material converted to a densified state obtained using the process described in Example 10. The polishing surface of the polishing pad in the densified state was heated by bringing the polishing surface of the polishing pad material in a densified state into contact for about 1 minute with a 254 mm dia 6.4 mm thick brass plate heated to 120° C. Over this one minute, the heating of the brass plate was continued using an electrically controlled hot plate (Corning #PC-220) and monitoring the temperature of the surface of the brass plate in contact with the polishing surface. The heating of the polishing surface of the test pad caused a portion of the polishing pad proximate the polishing surface to transition to a recovered state with the remainder of the actual thickness of the polishing layer remaining in a densified state. The polishing pad was then used to polish 13 wafers. The surface of the polishing pad was then heated again using the process noted above to transition another portion of the polishing pad proximate the polishing surface to a recovered state. The pad was then used to polish wafer 14. The removal rate versus wafer # data for the polishing tests performed using the polishing pad in a densified state with thermal conditioning are provided herein in FIG. 20.

EXAMPLE 12

Shape Memory Matrix Material Preparation

A shape memory matrix material was prepared by mixing (at about 50° C. and atmospheric pressure): 175 grams of glycerol propoxylate (average $M_n$~266); 349 grams of polycaprolactone (average $M_n$~530-b-530); and, 476 grams of polycarbodiimide-modified diphenylmethane diisocyanate (available from The Dow Chemical Company as Isonate® 143L).

EXAMPLE 13

Storage Modulus vs Temperature Measurement

Figure 21:
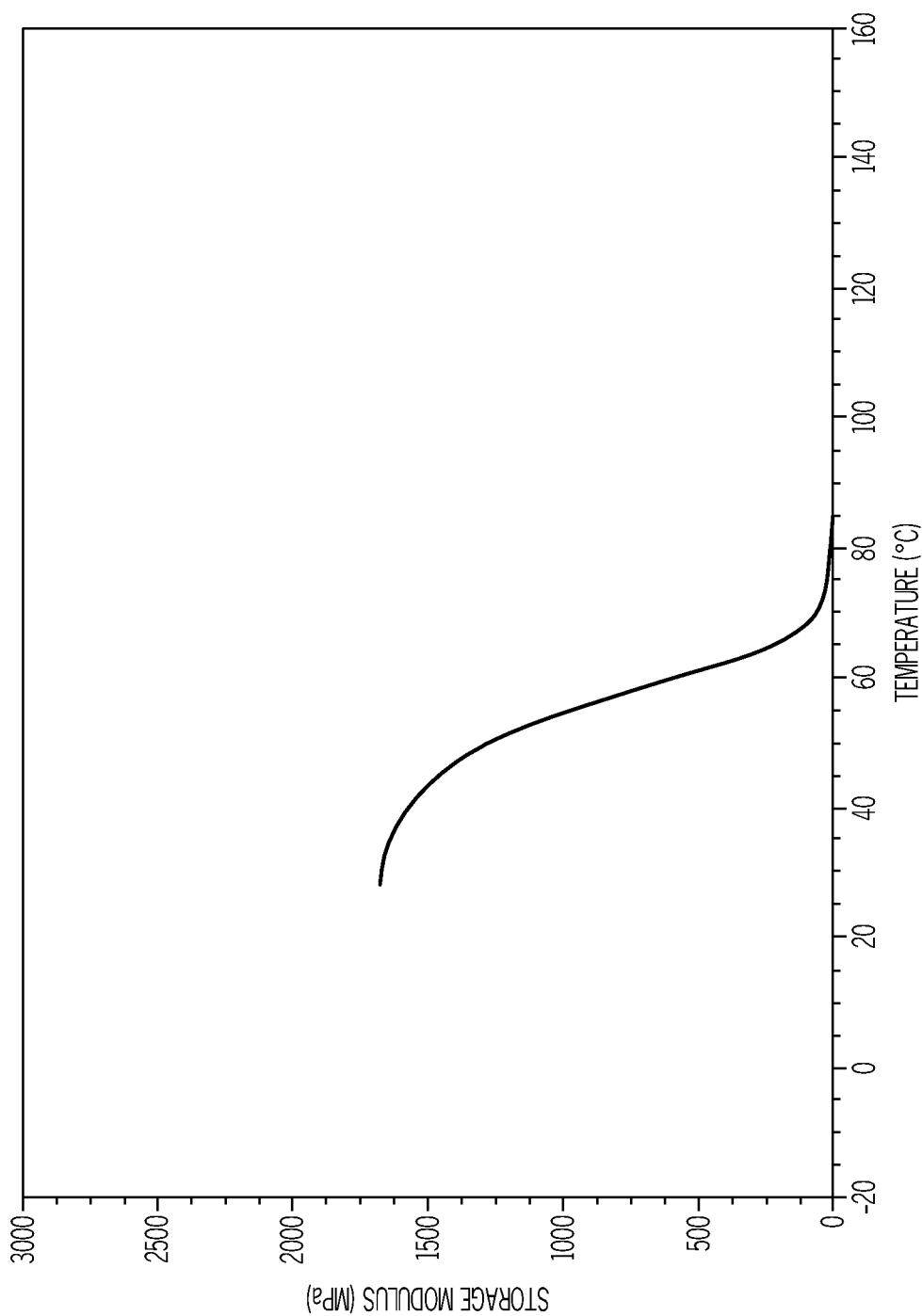
FIG. 21 is a graph providing storage modulus versus temperature curves for another shape memory matrix material.

Storage modulus in (MPa) versus temperature in (° C.) was plotted for the shape memory matrix material prepared as in Example 12 using a mechanical analyzer (DMA, TA Instruments Q800 model). The plotted curve is provided in FIG. 21.

We claim:

1. A method for producing a shape memory chemical mechanical polishing pad, comprising:
   providing a shape memory matrix material transformable between an original shape and a programmed shape;
   preparing a polishing layer in an original state exhibiting an original thickness, OT, comprising the shape memory matrix material in the original shape;
   subjecting the polishing layer to an external force;
   setting the shape memory matrix material to the programmed shape to provide the polishing layer in a densified state, wherein the polishing layer exhibits a densified thickness, DT;
   removing the external force;
   wherein the DT is <80% of the OT;
   wherein the shape memory matrix material exhibits a >70% reduction in storage modulus as the temperature of the shape memory matrix material is raised from $(T_g-20)°$ C. to $(T_g+20)°$ C., wherein $T_g$ is the glass transition temperature of the shape memory matrix material measured by dynamical mechanical analysis taking the inflection point in the storage modulus versus temperature curve as the $T_g$; and,
   wherein the polishing layer has a polishing surface adapted for polishing a substrate selected from at least one of a magnetic substrate, an optical substrate and a semiconductor substrate.

2. The method of claim 1, further comprising:
   providing a plurality of microelements;
   dispersing the plurality of microelements in the shape memory matrix material;
   heating the polishing layer to a temperature, T, above the glass transition temperature, $T_g$, for the shape memory matrix material;
   wherein the external force is an axial force which axially compresses the polishing layer to the densified thickness, DT, while maintaining the temperature of the polishing layer above the $T_g$ of the shape memory matrix material; and wherein the shape memory matrix material is set in the programmed shape by cooling the polishing layer to a temperature below the $T_g$ of the shape memory matrix material, while maintaining the axial force.

3. The method of claim 1, wherein the reduction in storage modulus has a magnitude of >800 MPa.

4. The method of claim 1, wherein the shape memory matrix material exhibits a $T_g$>45° C. to <80° C.

5. The method of claim 1, wherein the shape memory matrix material exhibits a >90% reduction in storage modulus as the temperature of the shape memory matrix material is raised from $(T_g-10)$° C. to $(T_g+10)$° C.; and wherein the reduction in storage modulus has a magnitude of >800 MPa.

6. The method of claim 1, wherein the shape memory matrix material comprises a reaction product of a mixture comprising glycerol propoxylate; polycarbodiimide-modified diphenylmethane diisocyanate; and at least one of polytetrahydrofuran and polycaprolactone.

7. The method of claim 1, wherein the shape memory matrix material comprises a reaction product of a mixture comprising a polyether-based, toluene diisocyanate terminated liquid urethane prepolymer; and a 4,4'-methylene-bis (2-chloroaniline).

8. A method of polishing a substrate, comprising:
providing a substrate selected from at least one of a magnetic substrate, an optical substrate and a semiconductor substrate;
providing a shape memory chemical mechanical polishing pad produced, using the method of claim 1; and,
creating dynamic contact between a polishing surface of the polishing layer and the substrate to polish a surface of the substrate.

9. The method of claim 8, further comprising:
conditioning the polishing surface of the polishing layer by exposing at east a portion of the polishing layer proximate the polishing surface to an activating stimulus;
wherein the portion of the polishing layer proximate the polishing surface exposed to the activating stimulus transitions from the densified state to a recovered state.

\* \* \* \* \*